(12) United States Patent
Touma

(10) Patent No.: US 7,099,595 B2
(45) Date of Patent: *Aug. 29, 2006

(54) OPTICAL WAVELENGTH MULTIPLEXING TRANSMISSION APPARATUS AND OPTICAL OUTPUT CONTROL METHOD FOR OPTICAL WAVELENGTH MULTIPLEXING TRANSMISSION APPARATUS

(75) Inventor: Eisaku Touma, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/893,322

(22) Filed: Jul. 19, 2004

(65) Prior Publication Data

US 2004/0264956 A1    Dec. 30, 2004

Related U.S. Application Data

(60) Division of application No. 10/262,876, filed on Oct. 3, 2002, now Pat. No. 6,819,875, which is a continuation of application No. PCT/JP00/02444, filed on Apr. 14, 2000.

(51) Int. Cl.
*H04B 10/02* (2006.01)

(52) U.S. Cl. .................. 398/177; 398/79; 398/181; 398/173; 398/6; 398/37; 398/11; 398/18; 398/30; 398/31; 398/33; 398/38; 359/341; 359/337

(58) Field of Classification Search .............. 398/173, 398/175, 177, 181, 140, 141, 30, 31, 33, 398/37, 38, 79, 6, 11, 18; 359/341, 337
See application file for complete search history.

(56) References Cited

U.S. PATENT DOCUMENTS

| 5,274,496 | A | 12/1993 | Fujiwara et al. |
| 5,440,418 | A | 8/1995 | Ishimura et al. |
| 5,500,756 | A | 3/1996 | Tsushima et al. ............ 359/174 |
| 5,801,860 | A * | 9/1998 | Yoneyama .................... 398/94 |
| 5,812,289 | A | 9/1998 | Tomooka et al. ............ 359/115 |
| 5,923,453 | A | 7/1999 | Yoneyama |
| 6,023,366 | A | 2/2000 | Kinoshita |
| 6,064,501 | A | 5/2000 | Roberts et al. ............. 359/110 |
| 6,229,631 | B1 | 5/2001 | Sato et al. .................. 359/110 |
| 6,292,289 | B1 | 9/2001 | Sugaya et al. .............. 359/337 |
| 6,466,348 | B1 | 10/2002 | Izumi ......................... 398/177 |

FOREIGN PATENT DOCUMENTS

| JP | SHO 61-12138 | 1/1986 |
| JP | 3-270520 | 12/1991 |

(Continued)

*Primary Examiner*—Hanh Phan
(74) *Attorney, Agent, or Firm*—Staas & Halsey LLP

(57) ABSTRACT

The present invention provides an optical wavelength multiplexing transmission apparatus and an optical output control method for an optical wavelength multiplexing transmission apparatus in an optical wavelength multiplexing transmission system using a main signal light and an OSC light. The optical wavelength multiplexing transmission apparatus (10a) is made up of a first transmitting/receiving section (52a) a second transmitting/receiving section (52b) and an apparatus supervisory control unit (54). This can not only achieve quick restoration from troubles, but also stably calculate an optical output level even if a change of the number of wavelengths to be multiplexed takes place in a main signal light, and even save troublesome adjustments for the improvement of reliability of a transmission line while eliminating the need for a signal source for the adjustment of a receive optical level at the initial installation.

7 Claims, 23 Drawing Sheets

FOREIGN PATENT DOCUMENTS

| | | |
|---|---|---|
| JP | 8-181656 | 7/1996 |
| JP | HEI 9-116504 | 5/1997 |
| JP | HEI 9-321701 | 12/1997 |
| JP | 10-22979 | 1/1998 |

* cited by examiner

FIG.7(a)

| MB1 | MB2 | MB3 | MB4 | MB5 | MB6 | MB7 | MB8 | MB9 | MB10 | MB11 | MB12 | MB13 | MB14 | MB15 | MB16 | MB17 | MB18 | MB19 | MB20 | MB21 | MB22 | MB23 | MB24 |
|---|---|---|---|---|---|---|---|---|---|---|---|---|---|---|---|---|---|---|---|---|---|---|---|
| WCS 1 | WCS 2 | WCS 3 | WCS 4 | WCR 1 | WCR 2 | WCR 3 | WCR 4 | RSV 1 | RSV 2 | RSV 3 | OPT OUT 1 | OPT OUT 2 | OSC OUT 1 | OSC OUT 2 | OPT IN 1 | OPT IN 2 | OSC IN 1 | OSC IN 2 | AMP TIN 1 | AMP TIN 2 | AMP DIF 1 | AMP DIF 2 | RSV 4 |

FIG.7(b)

| TIME SLOT | NAME | CONTENTS | TIME SLOT | NAME | CONTENTS | TIME SLOT | NAME | CONTENTS |
|---|---|---|---|---|---|---|---|---|
| MB1 | WCS1 | WVELENGTH OPERATION INFORMATION | MB9 | RSV1 | RESERVED | MB17 | OPT IN2 | MAIN SIGNAL INPUT MONITOR VALUE |
| MB2 | WCS2 | | MB10 | RSV2 | | MB18 | OSC IN1 | OSC LIGHT INPUT MONITOR VALUE |
| MB3 | WCS3 | | MB11 | RSV3 | | MB19 | OSC IN2 | |
| MB4 | WCS4 | | MB12 | OPT OUT1 | MAIN SIGNAL LIGHT OUTPUT MONITOR VALUE | MB20 | AMP TIN1 | AMP INPUT EXPEXTED VALUE |
| MB5 | WCR1 | WAVELENGTH TRANSMISSION SPEED INFORMATION | MB13 | OPT OUT2 | | MB21 | AMP TIN2 | |
| MB6 | WCR2 | | MB14 | OSC OUT1 | OSC LIGHT OUTPUT MONITOR VALUE | MB22 | AMP DIF1 | AMP INPUT EXPECTED VALUE DIFFERENCE |
| MB7 | WCR3 | | MB15 | OSC OUT2 | | MB23 | AMP DIF2 | |
| MB8 | WCR4 | | MB16 | OPT IN1 | MAIN SIGNAL INPUT MONITOR VALUE | MB24 | RSV4 | RESERVED |

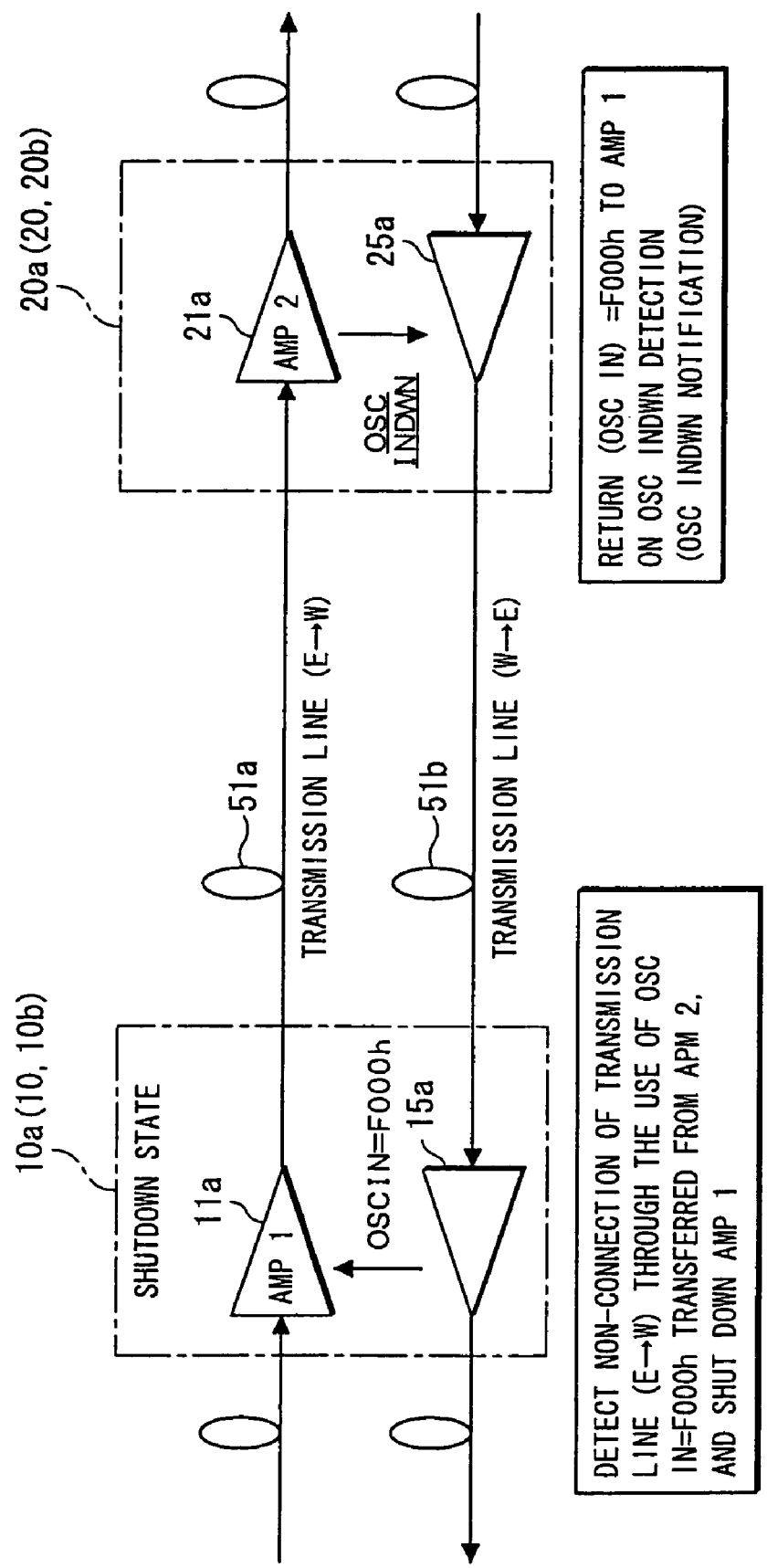

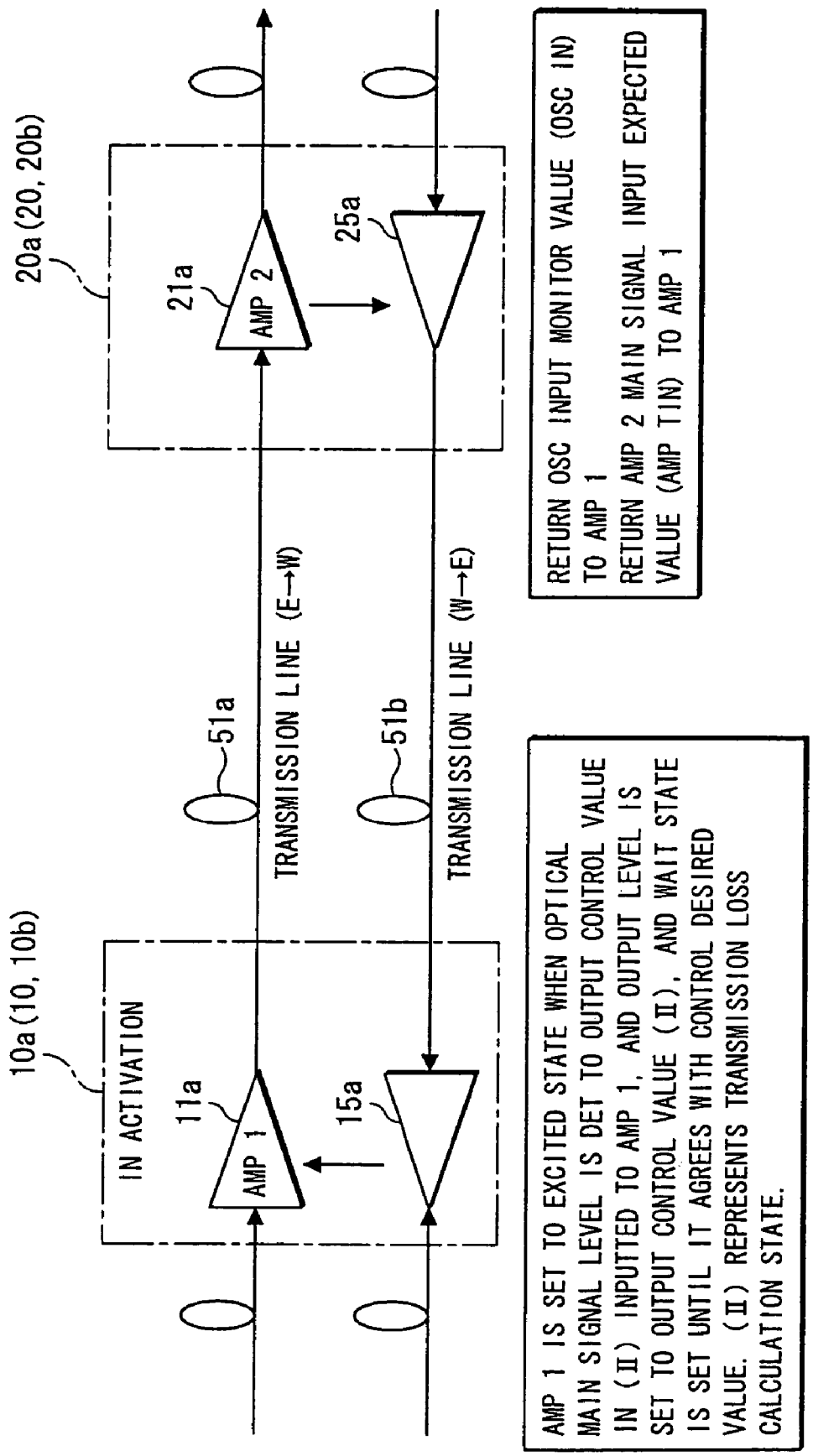

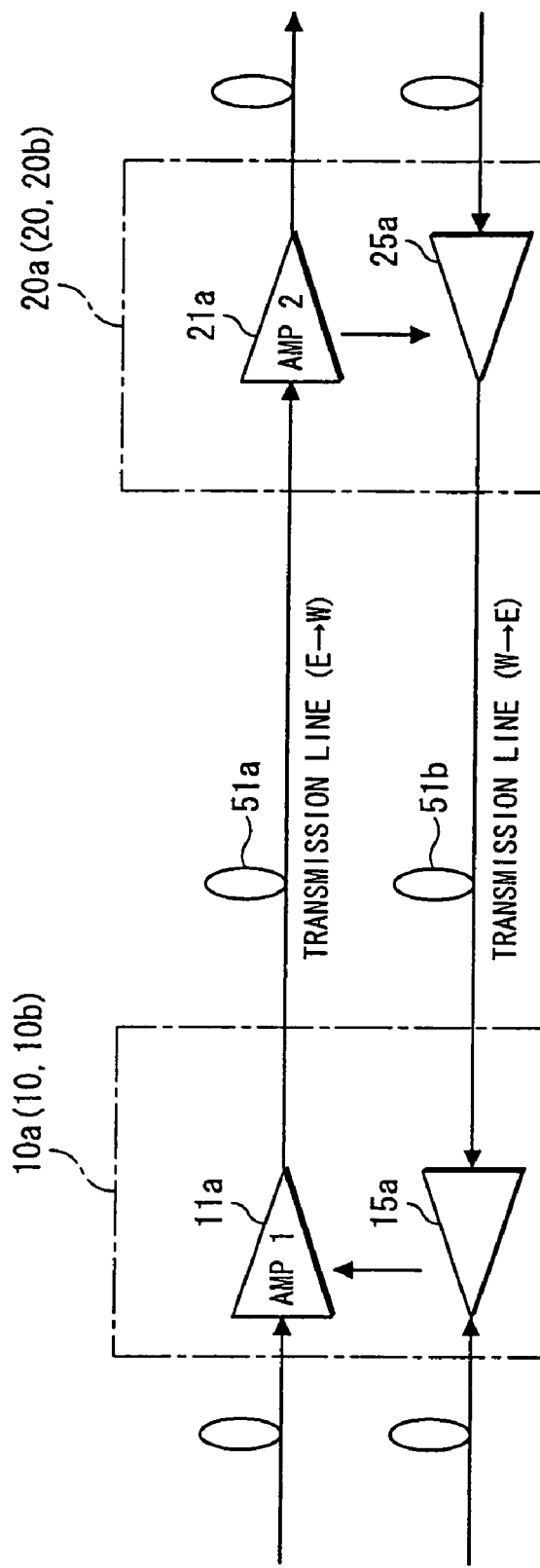

FIG. 14

| STATES | SEE OPTICAL OUTPUT INFORMATION | | SEE OPTICAL INPUT INFORMATION | | | | AMP OUTPUT CORRECTION VALUE (⑦INC/DEC) | ⑧AMP OUTPUT CONTROL VALUE | SHUTDOWN CONTROL |
|---|---|---|---|---|---|---|---|---|---|
| | ①OSC OUT | ②OPT OUT | ③OSC IN | ④OPT IN | ⑤AMP TIN | ⑥AMP DIFF | | | |
| (I) TRANSMISSION LINE DISCONNECTION STATE | NO EXECUTION | EXECUTION | OSC IN DWN DETECTION | NO EXECUTION | NO EXECUTION | NO EXECUTION | NO EXECUTION | — | SHUT DWN |
| (II) TRANSMISSION LINE LOSS CALCULATION STATE | EXECUTION | NO EXECUTION | EXECUTION | EXECUTION | EXECUTION | EXECUTION | NO EXECUTION | ⑤+(①−③) | SHUT DWN |
| (III) AMP ACTIVATION/OUTPUT STABILIZATION WAITING STATE | EXECUTION | EXECUTION | EXECUTION | EXECUTION | EXECUTION | EXECUTION | NO EXECUTION | ⑤+(①−③) | — |
| (IV) NORMAL OPERATION STATE | EXECUTION | EXECUTION | EXECUTION | EXECUTION | EXECUTION | EXECUTION | EXECUTION (ACCORDING TO VALUE/CODE IN CIRCLED 6) | ⑤+(①−③)+⑦ | — |

OPTICAL WAVELENGTH MULTIPLEXING TRANSMISSION APPARATUS AND OPTICAL OUTPUT CONTROL METHOD FOR OPTICAL WAVELENGTH MULTIPLEXING TRANSMISSION APPARATUS

This application is a divisional of application Ser. No. 10/262,876, filed Oct. 3, 2002, now U.S. Pat. No. 6,619,875 which is a continuing application, filed under 35 USC §111(a), of International Application PCT/JP00/02444, filed Apr. 14, 2000.

TECHNICAL FIELD

The present invention relates to an optical wavelength multiplexing transmission apparatus and optical output control method for the optical wavelength multiplexing transmission apparatus, suitable for use in an optical wavelength multiplexing transmission system including an optical wavelength multiplexing terminating set and an optical wavelength multiplexing repeater, using an optical direct amplifier, particularly for an optical wavelength multiplexing transmission system including a linear optical wavelength multiplexing repeater.

BACKGROUND ART

For fast transmission of a large volume of information, there has been employed a system based on an optical wavelength multiplexing transmission technique. This optical wavelength multiplexing transmission system is for transmitting a wavelength-multiplexed light with different wavelengths through one optical fiber. In recent years, an optical wavelength multiplexing transmission system, which provides a transmission rate of approximately 2.4 Gbps×16 waves (where "G" represents $10^9$ and "bit per second" signifies transmission rate per second), has been put to practical use.

Furthermore, on the design of a transmission line used for the optical wavelength multiplexing transmission, it is technically required to suppress the non-linear effects of an optical fiber. Still furthermore, in a case in which the aforesaid optical wavelength multiplexing transmission system is used as a linear repeating system, the key is maintaining the gain fattening in an optical band the optical amplifier puts to use. For this reason, as one example of meeting such a technical requirement, there is a method in which an optical amplifier is controlled through the use of ALC (Automatic Level Control).

An optical wavelength multiplexing transmission system will first be described with reference to FIGS. 18 to 20 and an ALC will then be described with reference to FIGS. 21 and 22. In the following description, an optical amplifier will sometimes be referred to as an "optical AMP" or simply as an "AMP", and the contents thereof are the same.

FIG. 18 is a block diagram showing a transmission side WDM (Wavelength Division Multiplexing) terminal station. In FIG. 18, a transmission side WDM terminal station 100a is an optical wavelength multiplexing transmission apparatus designed to perform the multiplexing for a wavelength-multiplexed light and the demultiplexing thereof, and acts as a transmission terminal station. Moreover, this transmission side WDM terminal station 100a is made up of a multiplexing unit (MUX) 16a, an up main signal light amplifying unit 31, an OSC (Optical Supervisory Channel) light transmitting unit 113b, a control unit 113c and an optical output monitor 113a.

The multiplexing unit 16a accomplishes optical coupling, and the up main signal light amplifying unit 31 compensates for a drop of an optical level at optical multiplexing and dispersion compensation, or in a transmission line or the like. Moreover, the optical output monitor 113a monitors an optical output level from a coupler (optical coupler) 60a in the up main signal light amplifying unit 31 to issue an output monitor value. This output monitor value is inputted to the control unit 113c to implement the output control of the up main signal light amplifying unit 31 and the information transfer to the OSC light transmitting unit 113b.

In addition, the OSC light transmitting unit 113b is for wavelength-multiplexing a sub-signal light, functioning as a control signal, and a main signal light for the purpose of the supervisory control of a remote station (not shown). In this case, the sub-signal light is equally referred to simply as an "OSC light". This OSC light transmitting unit 113b is for carrying out the switching control between the ALC control for automatically controlling the optical output level and the AGC control (Automatic Gain Control) for variably controlling the gain, and further for transmitting the number of transmission wavelengths forming the ALC setting information and the information such as a transmission rate to a linear repeater or reception side WDM terminal station lying on the downstream side. These ALC control and AGC control will be described later with reference to FIGS. 21 and 22.

In the following description, a main signal light signifies an optical wavelength-multiplexed signal to be linearly repeated between WDM terminal stations, while an OSC light (sub-signal light) represents a single wavelength light for supervisory control which does not pass through an optical amplifier and which is terminated at each of repeating sections. This OSC light does not affect the passing of a main signal light and does not pass through an optical amplifier, and is used as a supervisory control channel or pilot light. This "pass" signifies that it is in a communication state. Although a WDM terminal station is equally referred to as a "WDM terminal device", in the following description it sometimes will be referred to simply as an "terminal station".

Moreover, in FIGS. 18 to 20, the same reference numerals as those used above denote the same or equivalent functions, and the further description thereof will be omitted.

FIG. 19 is a block diagram showing a WDM linear repeater. In FIG. 19, a WDM linear repeater 100b is an optical wavelength multiplexing transmission apparatus, and operates as a linear repeater (linear repeating device). An OSC light transmitted from a former station is received by an OSC light receiving unit 113d located on the wavelength-multiplexed light input side and the reception level is inputted as a reception value to the control unit 113c. Moreover, a wavelength-multiplexed light outputted from the up main signal light amplifying unit 31 is monitored in the optical output monitor 113a and the output monitor value is inputted to the control unit 113c. In the control unit 113c, an OSC transmission value is calculated on the basis of these values and is outputted to the OSC light transmitting unit 113b to be transmitted to an adjacent station (next station). Thus, information is transmitted through the use of an OSC light different from a main signal light.

FIG. 20 is a block diagram showing a reception side WDM terminal station. In FIG. 20, a reception side WDM terminal station 100c is also constructed as an optical wavelength multiplexing transmission apparatus, and works as a transmission (reception) terminal station. A main signal light from a transmission line is amplified in the up main signal light amplifying unit 31 and, following this, in a demultiplexing unit (DMUX) 16b, a received wavelength-multiplexed light is demultiplexed into lights with optical wavelengths λ1 to λ8 and then outputted.

In addition, the OSC light is received by the OSC light receiving unit 113d and the OSC reception value is inputted to the control unit 113c. On the other hand, for the main signal light, an output light level is monitored in the optical output monitor 113a and inputted as an output monitor value to the control unit 113c. On the basis of these values, the control unit 113c outputs an output control signal to a variable attenuator 31b in the up main signal light amplifying unit 31.

As described above, the transmission side WDM terminal station 100a, the WDM linear repeater 100b and the reception side WDM terminal station 100c, shown in FIGS. 18 to 20, are connected through optical fiber transmission lines, and a wavelength-multiplexed light comprising a main signal light and an OSC light is transmitted from the transmission side WDM terminal station 100a through the downstream side WDM linear repeater 100b to the reception side WDM terminal station 100c.

Furthermore, with respect to the output level control of an optical amplifier, a description will be given hereinbelow of ALC control and AGC control in a case in which the number of wavelengths to be multiplexed increases and decreases. The ALC control will first be described with reference to FIGS. 21(*a*) to 21(*c*) and the AGC control will then be described with reference to FIGS. 22(*a*) to 22(*c*).

FIGS. 21(*a*) to 21(*c*) are illustrations for explaining an ALC operation at an increase/decrease in number of wavelengths. As one example, a spectrum waveform shown in FIG. 21(*a*) has peak values $L_1$ at two places on an optical wavelength axis (horizontal axis). In this state, when the number of wavelengths is decreased (contracted), one wavelength appears as shown in FIG. 21(*b*) and the peak value becomes higher than $L_1$. On the other hand, if the number of wavelengths is increased (extended), three wavelengths appear as shown in FIG. 21(*c*) and the peak value becomes lower than $L_1$.

FIGS. 22(*a*) to 22(*c*) are illustrations for explaining an AGC operation at an increase/decrease in number of wavelengths. In a state where peak values $L_2$ exist as shown in FIG. 22(*a*), when the number of wavelengths is decreased, the peak values $L_2$ remain intact as shown in FIG. 22(*b*). Even if the number of wavelengths is increased, the peak values $L_2$ assume a constant value as shown in FIG. 22(*c*).

Meanwhile, a former-stage AGC amplifier 31a and a latter-stage AGC amplifier 31d are required to vary their output levels in accordance with the number of optical wavelengths to be multiplexed. If an increase/decrease in number of optical wavelengths takes place in a state where each of the optical amplifiers 31a and 31d conducts the ALC operation, each of the optical amplifiers 31a and 31d operates to maintain the optical output level to a constant value irrespective of the input level. Accordingly, in consequence, the output level per wavelength varies.

For this reason, at the increase/decrease in number of wavelengths, the control unit 113c switches the operation of each of the optical amplifiers 31a and 31d from the ALC control to the AGC control in a state where the ALC control level is fixed to a previous value, which makes no variation in optical output level for each optical wavelength even at the increase/decrease in number of wavelengths.

FIG. 23 is an illustration of a configuration of an optical wavelength multiplexing transmission system. In FIG. 23, in transmission lines, optical attenuators (optical PADs) 114 are provided, each of which attenuates the level of a wavelength-multiplexed light. The optical levels in the transmission lines are monitored by optical power meters 115 placed in the transmission side WDM terminal station 100a, the WDM linear repeater 100b and the reception side WDM terminal station 100c, respectively, thereby enabling the adjustment of the optical levels.

In the case of the optical wavelength multiplexing transmission shown in FIG. 23, the light to be transmitted is composed of multiple wavelengths and the non-linear effect due to the transmission optical fiber becomes noticeable; therefore, the optical power which can be sent to the transmission line has an upper limit. Moreover, due to the dynamic range determined by the NF (Noise Figure: noise characteristic) of an optical amplifier, the reception level of the optical amplifier is required to be severely adjusted up to several dBs.

For this reason, so far, for this optical input level adjustment, the optical level of a signal light has been measured by a level meter on the downstream side and the optical level adjustment has been made by the insertion of an optical attenuator (optical PAD) or variable attenuator (ATT) so that the optical level measured agrees with the input dynamic range, which requires a troublesome field adjustment work.

Accordingly, a supervisor is required to handle the troublesome field adjustment work resulting from a secular change of the optical PAD and others or environmental variation. Moreover, it is considered to eliminate the need for this manual work by automating the control and to implement the feedback control of the transmission level on the basis of the optical level (total optical level) of the total main signal light on the reception side.

However, the employment of this automation system becomes difficult because of the following circumstances (1) and (2) peculiar to a wavelength multiplexing transmission/linear repeating system, so effects are unobtainable.

(1) As a characteristic of an optical wavelength multiplexing transmission system, the total optical level varies in accordance with the number of wavelengths to be put to use. Moreover, in the case of varying due to the extension and contraction in the number of wavelengths or the shutdown (disconnection) of a wavelength-multiplexed light stemming from the troubles of lower-order (downstream) equipment, the total optical level varies in a short period of time. This provides a problem in that, if the control of the transmission optical level is made on the basis of the reception level of the total optical level, the disturbance of the optical level occurs due to the increase/decrease in number of wavelengths, the shutdown or the like, which leads to unstable transmission quality.

(2) Since a linear optical amplifying system issues an optical output only when a wavelength-multiplexed light is inputted thereto, it is required that the optical input is made through the use of a measuring instrument or the like at the adjustment in the field. This provides a problem in that, not until a wavelength-multiplexed light is actually inputted to an optical amplifier to make this optical amplifier initiate an optical output, the reception side receives a signal for the level adjustment.

In addition, Japanese Patent Laid-Open No. HEI 9-116504 discloses a method of measuring a property of an optical transmission line in which a wavelength-multiplexed signal light propagates, and an optical transmission line property measuring method in which a portion of light propagating on an optical transmission line is led to another optical transmission line for measuring optical power distributions of up and down signal lights with different wavelengths. However, this publication does not disclose the transmission/reception of control information using OSC light.

The present invention has been developed in consideration of these problems, and it is therefore a first object of the invention to, in an optical wavelength multiplexing transmission system which transmits a wavelength-multiplexed light while adjusting an optical level between optical amplifiers through the use of a main signal light and an OSC light, provide an optical wavelength multiplexing transmission apparatus and an optical output control method for an optical wavelength multiplexing transmission apparatus, capable of adjusting a transmission optical level through the use of the OSC light without delivering a main signal light by monitoring transmission output levels and receive input levels of the main signal light and the OSC light, thus enabling quick restoration from troubles.

A second object of the invention is to provide an optical wavelength multiplexing transmission apparatus and an optical output control method for an optical wavelength multiplexing transmission apparatus, capable of achieving stable calculation of an optical output level even when a change of the number of wavelengths of a main signal light to be multiplexed takes place.

A third object of the invention is to provide an optical wavelength multiplexing transmission apparatus and an optical output control method for an optical wavelength multiplexing transmission apparatus, capable of eliminating the need for a signal source for a receive optical level adjustment at the initial installation and eliminating the need for optical parts for the receive optical level adjustment by eliminating the troublesome adjustment for improving the reliability of the transmission lines, and capable of coping with a change with the passage of time on the transmission line loss after the field adjustment (level adjustment work in the field) or troubles, or a variation of the transmission line loss due to the moving without requiring the re-adjustment.

DISCLOSURE OF INVENTION

For these objects, an optical wavelength multiplexing transmission apparatus according to the present invention is characterized by comprising an up main signal light amplifying unit for amplifying a wavelength-multiplexed up main signal light to be transmitted to an up downstream-side station, an up sub-signal light transmitting unit for inserting up control information on a transmission situation into an up sub-signal light and for outputting the up control signal inserted sub-signal light to the up downstream-side station, an up sub-signal light receiving unit for receiving an up sub-signal light including up control information from an up upstream-side station to extract the up control information from the up sub-signal light, an up output monitoring unit operable to extract output levels of the up main signal light and up sub-signal light outputted to the up downstream-side station, an up input monitoring unit operable to extract input levels of the up main signal light and up sub-signal light inputted from the up upstream-side station, and an up control unit connected to the up main signal light amplifying unit, the up sub-signal light transmitting unit, the up sub-signal light receiving unit, the up output monitoring unit and the up input monitoring unit for calculating a loss in a transmission line on the basis of the up sub-signal light and for controlling the output level of the up main signal light.

Thus, first, regardless of the passing of a main signal light, the adjustment of a transmission level can be made through the use of a sub-signal light, thereby achieving the restoration from troubles occurring due to the shutdown of the main signal light. Second, even if the number of wavelengths to be multiplexed in a main signal light is changed to cause the disturbance of the output of an optical amplifier, since the OSC light output is not affected thereby, it is possible to maintain the stable output level without having great influence on the output level calculation. Third, a signal source for the reception level adjustment becomes unnecessary at initial installation, which eliminates the troublesome adjustment.

In addition, an optical wavelength multiplexing transmission apparatus according to the present invention is characterized by comprising a down main signal light amplifying unit for amplifying a wavelength-multiplexed down main signal light to be transmitted to a down downstream-side station, a down sub-signal light transmitting unit for inserting down control information on a transmission situation into a down sub-signal light and for outputting the down control signal inserted sub-signal light to the down downstream-side station, a down sub-signal light receiving unit for receiving a down sub-signal light including down control information from a down upstream-side station to extract the down control information from the down sub-signal light, a down output monitoring unit operable to extract output levels of the down main signal light and down sub-signal light outputted to the down downstream-side station, a down input monitoring unit operable to extract input levels of the down main signal light and down sub-signal light inputted from the down upstream-side station, and a down control unit connected to the down main signal light amplifying unit, the down sub-signal light transmitting unit, the down sub-signal light receiving unit, the down output monitoring unit and the down input monitoring unit for calculating a loss in a transmission line on the basis of the down sub-signal light and for controlling the output level of the down main signal light.

Thus, this prevents a drop of the reliability of a transmission line due to the insertion of an optical PAD or the like used for the reception level adjustment, and copes with a change with the passage of time on the transmission line loss after the field adjustment and a transmission line loss resulting from the moving of a substation without requiring the re-adjustment.

Still additionally, an optical output control method for an optical wavelength multiplexing transmission apparatus according to the present invention is characterized by comprising an up sub-signal light outputting step in which an up upstream-side first optical wavelength multiplexing transmission apparatus outputs an up sub-signal light including an output monitor value of an up main signal light and an output monitor value of an up sub-signal light to an up downstream-side second optical wavelength multiplexing transmission apparatus, an up sub-signal light receiving step in which the second optical wavelength multiplexing apparatus receives the up sub-signal light to extract sub-signal light reception values on the output monitor value of the up main signal light and the output monitor value of the up sub-signal light from the up sub-signal light, an input optical level detecting step in which the second optical wavelength multiplexing transmission apparatus detects an input monitor value of the received up main signal light and an input monitor value of the received up sub-signal light, a turn information transmitting step in which the second optical wavelength multiplexing transmission apparatus transmits the input monitor value of the up main signal light and the input monitor value of the up sub-signal light, detected in the input optical level detecting step, the sub-signal light reception value extracted in the up sub-signal light receiving step, an expected value of an input level of an up main signal light to an optical amplifier, and information on a difference between an input level of an up main signal light to an optical amplifier and an actually inputted input level to the first optical wavelength multiplexing transmission apparatus in a state inserted into a down sub-signal light, a loss calculating step in which the first optical wavelength multiplexing transmission apparatus calculates a transmission line loss on the basis of the information transmitted in the turn information transmitting step and a difference between a reception level of a down sub-signal light and an output level of a down sub-signal light, and an adjusting step in which the first optical wavelength multiplexing transmission apparatus corrects an output level of an up main signal light on the basis of the transmission line loss.

This can prevent the occurrence of the disturbance of the optical level regardless of an increase/decrease in number of wavelengths for improving the transmission quality and eliminating the need for the input of light for measurement, thereby rapidly simplifying the adjustment and, hence, eliminating the troublesome field adjustment work.

BRIEF DESCRIPTION OF DRAWINGS

FIGS. 7(a) and 7(b) are illustrations of configurations of sub-frames.

FIG. 10 is an illustration for explaining an operation in a transmission line disconnection state in the first embodiment of the present invention.

FIG. 12 is an illustration for explaining an operation in optical amplifier activation/output stabilization wait state in the first embodiment of the present invention.

FIG. 13 is an illustration for explaining an operation in a normal operation state in the first embodiment of the present invention.

FIG. 14 is an illustration of an output control value of an optical amplifier in the first embodiment of the present invention.

BEST MODE FOR CARRYING OUT THE INVENTION (A) Description of First Embodiment of the Invention FIG. 1 is an illustration of a configuration of an optical wavelength multiplexing transmission system to which the present invention is applicable. In FIG. 1, an optical wavelength multiplexing transmission system 50 is a system for transmitting a single wavelength light with different wavelengths through one optical fiber in a multiplexed state, and is made up of optical wavelength multiplexing transmission apparatus 10 and 20 and transmission lines 51a and 51b.

The terms to be used in the following description signify the following meanings. In FIG. 1, the transmission direction from the left side (East side) to the right side (West side) is an "up" direction and is expressed as E→W, while the direction from the right side to the left side is a "down" direction and is expressed as W→E. Likewise, an "up downstream-side station" signifies an optical wavelength multiplexing transmission apparatus existing on the downstream side in the up direction (upstream side in the down direction) while a "down downstream-side station" signifies an optical wavelength multiplexing transmission apparatus existing on the upstream side in the up direction (downstream side in the down direction). Moreover, each of an "up main signal light" and a "down main signal light" will sometimes be referred to simply as a "main signal light", unless otherwise specified particularly. Likewise, each of an "up OSC light" and a "down OSC light" will sometimes be referred to simply as an "OSC light".

Figure 1:
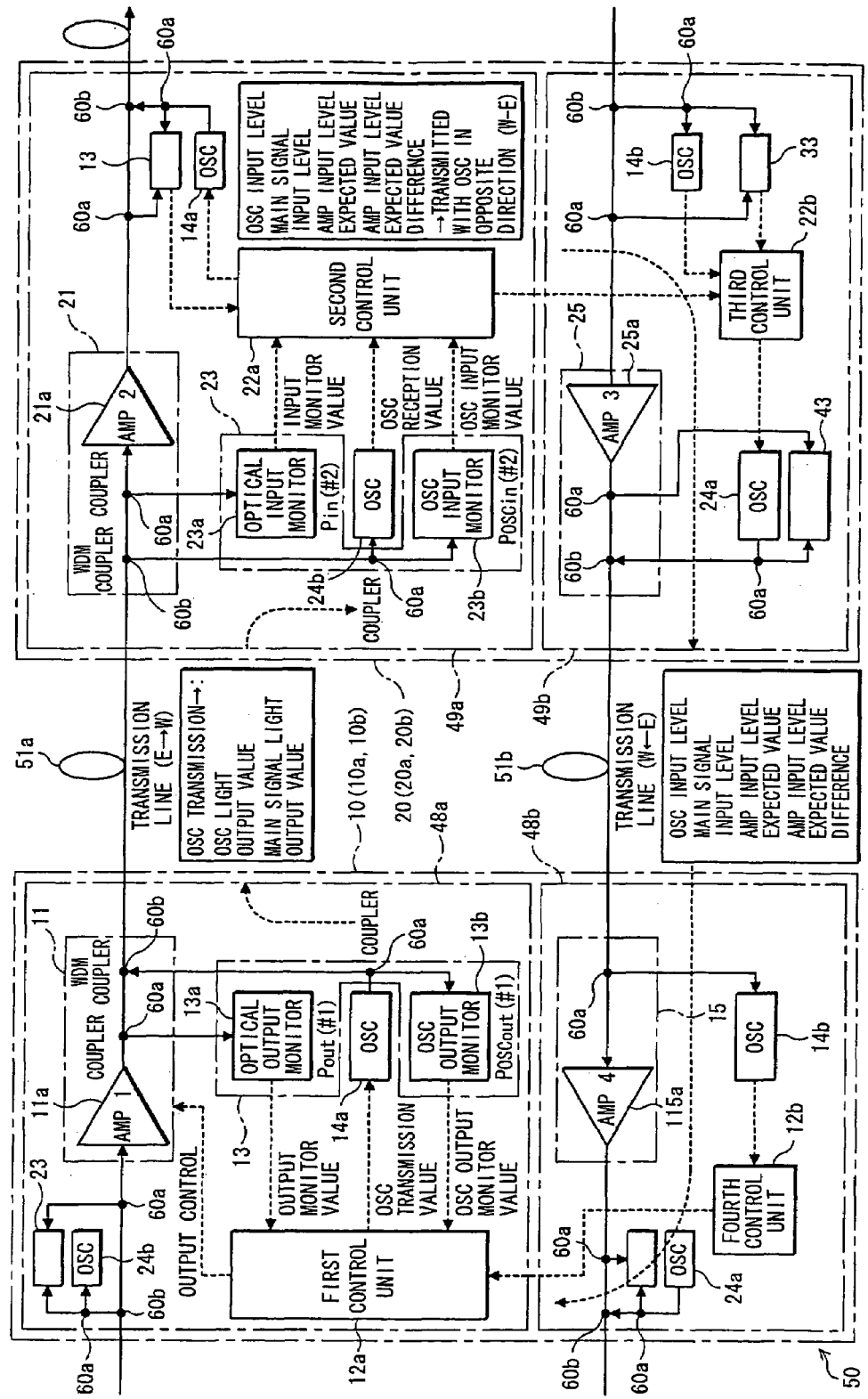
FIG. 1 is an illustration of a configuration of an optical wavelength multiplexing system to which the present invention is applicable.

An optical wavelength multiplexing transmission apparatus 10, shown in FIG. 1, is for interchanging wavelength-multiplexed lights, and includes a first transmitting/receiving section 48a for amplifying a wavelength-multiplexed light from an up upstream-side station (not shown) to output it to an up downstream-side station (optical wavelength multiplexing transmission apparatus 20) and a second transmitting/receiving section 48b for amplifying a wavelength-multiplexed light from a down upstream-side station to output it to a down downstream-side station.

The first transmitting/receiving section 48a is composed of an up main signal light amplifying unit 11, an up output monitoring unit 13, an up OSC light transmitting unit (up sub-signal light transmitting unit) 14a, a first control unit 12a, an up input monitoring unit 23 and an up OSC light receiving unit (up sub-signal light receiving unit) 24b.

The second transmitting/receiving section 48b is composed of a down main signal light amplifying unit 15, a down OSC light receiving unit (down sub-signal light receiving unit) 14b, a fourth control unit 12b, a down output monitoring unit 43, and a down OSC light transmitting unit (down sub-signal light transmitting unit) 24a. Incidentally, each of the up OSC light transmitting unit 14a and the down OSC light receiving unit 14b is briefly sketched as "OSC" in FIG. 1.

In this configuration, the up main signal light amplifying unit 11 in the first transmitting/receiving section 48a is for amplifying a wavelength-multiplexed up main signal light to be transmitted to an up downstream-side station, and includes an optical amplifier (AMP 1) 11a, a coupler 60a and a WDM coupler 60b. The optical amplifier 11a is designed to amplify a wavelength-multiplexed light, and the coupler 60a is designed to branch the wavelength-multiplexed light outputted from the optical amplifier 11a, while the WDM coupler 60b is made to couple (multiplex) an up main signal light outputted from the optical amplifier 11a in a state amplified and an up OSC light outputted from the up OSC light transmitting unit 14a. The details on the optical wavelength selection of each of the coupler 60a and the WDM coupler 60b will be described later.

The up output monitoring unit 13 has a function to extract the output levels of the up main signal light and an up OSC light to be outputted to an up downstream-side station, and includes an up optical output monitoring unit 13a, an up OSC output monitoring unit (up sub-signal light output monitoring unit) 13b and a coupler 60a.

In this case, the up optical output monitoring unit 13a is placed on the output side of the up main signal light amplifying unit 11 for extracting an output level of an up main signal light, and this function is realizable with, for example, a photodiode. Incidentally, the up main signal light output level is expressed by $P_{out}$, and (#1) represents an output from the optical amplifier 11a.

Furthermore, the up OSC output monitoring unit 13b is placed on the output side of the up OSC light transmitting unit 14a for extracting an output level of an up OSC light, and this function is also realizable with a photodiode. Still furthermore, the up OSC light output level is expressed by $P_{OSCout}$, and (#1) denotes an output from the optical amplifier 11a.

In addition, the up OSC light transmitting unit 14a is for inserting up control information on a transmission situation into an up OSC light to output it to an up downstream-side station. The up OSC light transmitting unit 14a is made to determine this up control information on the basis of an output level of an up main signal light and an output level of an up OSC light. Control information included in an up OSC light from this up OSC light transmitting unit 14a will be described later with reference to FIGS. 6(a), 6(b), FIGS. 7(a) and 7(b).

Still additionally, the first control unit 12a is connected to the up main signal light amplifying unit 11 and the up OSC light transmitting unit 14a for calculating a loss on the basis of an output level of an up main signal light and a reception level of an up OSC light received in an up downstream-side station to correct the output level of the up main signal light, and for inputting the output level of the up OSC light and the output level of the up main signal light to the up OSC light transmitting unit 14a.

Concretely, the first control unit 12a makes a coarse adjustment on an up main signal light output control value for the optical amplifier 11a on the basis of the transmission line loss calculated from the up OSC light and activates the optical amplifier 11a. This "coarse adjustment" signifies the adjustment of an output level of an up main signal light made through correction calculation in which a difference between the loss calculated using the up OSC light and a loss in a transmission line with respect to the wavelength of the up main signal light is multiplied by a constant determined according to a type of an optical fiber. That is, the first control unit 12a is designed to add a preset correction quantity in a limited range to a loss occurring during the transmission.

This function of the first control unit 12a is attainable with, for example, a software. Likewise, other control units in the following description are also realizable with a software.

Moreover, the up input monitoring unit 23 in the first transmitting/receiving section 48a shown in FIG. 1 has a function to extract the input levels of an up main signal light and an up OSC light inputted from an up upstream-side station (not shown). The OSC light receiving unit 24b is designed to receive an up OSC light, including up control information, from an up upstream-side station for extracting the up control information from the up OSC light. The details of each of the up input monitoring unit 23 and the up OSC light receiving unit 24b will be described later.

Furthermore, a description will be given hereinbelow of a lower half portion of this optical wavelength multiplexing transmission apparatus 10. The down main signal light amplifying unit 15 in the second transmitting/receiving section 48b is for amplifying a wavelength-multiplexed down main signal light to be transmitted to a down downstream-side station (not shown), and is made up of an optical amplifier 115a (AMP 4) for amplifying and outputting a wavelength-multiplexed light and a coupler 60a for branching a light with a predetermined wavelength from that wavelength-multiplexed light.

The down OSC light receiving unit 14b is for receiving a down OSC light including down control information from a down upstream-side station (optical wavelength multiplexing transmission apparatus 20) to extract the down control information from this down OSC light. Moreover, this down OSC light receiving unit 14b is made to determine the down control information on the basis of a reception level of a down OSC light received by the down downstream-side station, a reception level of a down main signal light received by the down downstream-side station, an expected value of an input level of a down main signal light amplified by the down downstream-side station and difference information between an input level of the down main signal light amplified by the down downstream-side station and an input level of a down main signal light actually inputted. In this case, the "down downstream-side station" is the same as an up upstream-side station.

The fourth control unit 12b is connected to the down OSC light receiving unit 14b, the down output monitoring unit 43 and the down OSC light transmitting unit 24a for outputting a reception level of an up main signal light received by a down upstream-side station, a reception level of an up OSC light received by the down upstream-side station, an expected value of an input level of an main signal light amplified by the down upstream-side station and difference information between an input level of an up main signal light amplified by the down upstream-side station and an input level of an up main signal light actually inputted.

The down OSC light transmitting unit 24a is for inserting down control information on a transmission situation into a down OSC light to output it to a down downstream-side station. Moreover, the down OSC light transmitting unit 24a is designed to determine the down control information on the basis of an output level of a down main signal light and an output level of a down OSC light. Still moreover, the down output monitoring unit 43 has a function to extract output levels of a down main signal light and a down OSC light to be outputted to a down downstream-side station. The detailed description about these down OSC light transmitting unit 24a and down output monitoring unit 43 will be given later.

In addition, each of the transmission lines 51a and 51b is an optical fiber transmission line, and in the following description, let it be assumed that the transmission line 51a extends in the E→W direction while the transmission line 51b extends in the W→E direction.

Secondly, a description will be given hereinbelow of the optical wavelength multiplexing transmission apparatus 20 lying in opposed relation thereto. As in the case of the optical wavelength multiplexing transmission apparatus 10, the optical wavelength multiplexing transmission apparatus 20 is also for transmitting/receiving a wavelength-multiplexed light, and is made up of a first transmitting/receiving section 49a for amplifying a wavelength-multiplexed light from an up upstream-side station (optical wavelength multiplexing transmission apparatus 10) to output it to an up downstream-side station (not shown) and a second transmitting/receiving section 49b for amplifying a wavelength-multiplexed light from a down upstream-side station (not shown) to output it to a down downstream-side station (optical wavelength multiplexing transmission apparatus 10).

The first transmitting/receiving section 49a is composed of an up main signal light amplifying unit 21, an up input monitoring unit 23, an up OSC light receiving unit 24b, a second control unit 22a, an up output monitoring unit 13 and an up OSC light transmitting unit 14a.

The second transmitting/receiving section 49b is composed of a down main signal light amplifying unit 25, a down OSC light transmitting unit 24a, a third control unit 22b, a down input monitoring unit 33, a down OSC light receiving unit 14b, a down OSC light transmitting unit 24a and a down output monitoring unit 43.

Incidentally, each of the up OSC light receiving unit 24b and the down OSC light transmitting unit 24a is briefly sketched as "OSC" in FIG. 1.

In this case, the up main signal light amplifying unit 21 in the first transmitting/receiving section 49a is for amplifying a wavelength-multiplexed up main signal light to be transmitted to an up downstream-side station, and includes an optical amplifier 21a, a WDM coupler 60b and a coupler 60a. The optical amplifier 21a is constructed similarly to the optical amplifier 11a of the optical wavelength multiplexing transmission apparatus 10, and the description there of will be omitted for avoiding the overlapping.

The up input monitoring unit 23 has a function to extract input levels an up main signal light and up OSC light inputted from an up upstream-side station, and includes an up optical input monitoring unit 23a, an up OSC input monitoring unit (up sub-signal light input monitoring unit) 23b and a coupler 60a.

This up optical input monitoring unit 23a is located on the input side of the up main signal light amplifying unit 21 for extracting an input level of an up main signal light. The input level of the up main signal light is expressed by $P_{in}$, and (#2) represents an input to the optical amplifier 21a.

The up OSC input monitoring unit 23b is placed on the input side of the up OSC light receiving unit 24b for extracting an input level of an OSC light. Likewise, the input level of the up OSC light is expressed by $P_{OSCin}$, and (#2) signifies an input to the optical amplifier 21a. Each of the functions of these up optical input monitoring unit 23a and up OSC input monitoring unit 23b is realized with, for example, a photodiode.

The up OSC light receiving unit 24b is for receiving an up OSC light including up control information from an up upstream-side station to extract the up control information from this up OSC light. The up OSC light receiving unit 24b is made to determine the up control information on the basis of a reception level of an up OSC light received in an up downstream-side station, a reception level of an up main signal light received in an up downstream-side station, an expected value of an input level of an up main signal light amplified in an up downstream-side station and information on a difference between an input level of an up main signal light amplified in an up downstream-side station and an input level of an up main signal light actually inputted.

Incidentally, the WDM coupler 60b and the coupler 60a are the same as those mentioned above, and in the following description, the further description will be omitted unless otherwise specified particularly.

Moreover, the second control unit 22a is for outputting a reception level of an up main signal light received by an up downstream-side station, a reception level of an up OSC light received by the up downstream-side station, an expected value of an input level of an up main signal light amplified by the up downstream-side station and information on a difference between an input level of an main signal light amplified by the up downstream-side station and an input level of an up main signal light actually inputted.

The second control unit 22a and the first control unit 12a cooperate with each other to realize a function as an up control unit. That is, the up control unit (the first control unit 12a and the second control unit 22a) is connected to the up main signal light amplifying unit 11, the up OSC light transmitting unit 14a, the up OSC light receiving unit 24b, the up output monitoring unit 13 and the up input monitoring unit 23 for calculating a loss in a transmission line on the basis of an up OSC light and further for controlling an output level of an up main signal light.

Furthermore, the down main signal light amplifying unit 25 of the second transmitting/receiving section 49b lying on the lower side of the optical wavelength multiplexing transmission apparatus 20 is for amplifying a wavelength-multiplexed down main signal light to be transmitted to a down downstream-side station, and is equipped with an optical amplifier 25a (AMP 3) and a WDM coupler 60b.

In this case, the WDM coupler 60b couples a wavelength-multiplexed light from the optical amplifier 25a with a wavelength-multiplexed light from the down OSC light transmitting unit 24a and outputs the resultant light to the transmission line 51b.

The down OSC light transmitting unit 24a is for inserting down control information on a transmission situation into a down OSC light to output it to a down downstream-side station. Moreover, this down OSC light transmitting unit 24a is made to determine the down control information on the basis of an output level of a down main signal light and an output level of a down OSC light. That is, an output signal of a down OSC light from the down OSC light transmitting unit 24a is extracted in the down output monitoring unit 43.

The third control unit 22b is connected to the down main signal light amplifying unit 25 and the down OSC light transmitting unit 24a for calculating a loss on the basis of an output level of a down main signal light and a reception level of a down OSC light received by a down downstream-side station to correct the output level of the down main signal light and further for inputting the output level of the down OSC light and the output level of the down main signal light to the down OSC light transmitting unit 24a. Moreover, this third control unit 22b is made to perform a correction calculation by multiplying a constant according to the type of an optical fiber by a difference between the loss calculated from the down OSC light and a loss in a transmission line with respect to the wavelength of the down main signal light, thereby adjusting the output level of the down main signal light.

In addition, the third control unit 22b and the fourth control unit 12b cooperate with each other to realize a function as a down control unit. That is, the down control unit (the third control unit 22b and the fourth control unit 12b) is connected to the down main signal light amplifying section (25, 15), the down OSC light transmitting unit 24a, the down OSC light receiving unit 14b, the down output monitoring unit 43 and the down input monitoring unit 33 for calculating a loss in a transmission line on the basis of a down OSC light and further for controlling the output level of a down main signal light.

Still additionally, the down input monitoring unit 33 has a function to extract input levels of a down main signal light and a down OSC light inputted from a down upstream-side station, and the down OSC light receiving unit 14b, the down OSC light transmitting unit 24a and the down output monitoring unit 43 are the same as those mentioned above, and the further description thereof will be omitted.

With this configuration, an optical output level of an up OSC light to be transmitted from the optical amplifier 11a of the optical wavelength multiplexing transmission apparatus 10 to the optical amplifier 21a of the optical wavelength multiplexing transmission apparatus 20 is digitized by the up OSC output monitoring unit 13b and then transmitted to the first control unit 12a. Likewise, an optical output level of an up main signal light is also monitored and transmitted to the first control unit 12a. In this first control unit 12a, an output level of an up OSC light and an output level of an up main signal light are calculated, and information on these levels is introduced into an up OSC light and are transferred through the transmission line 51a to the opposed side second control unit 22a.

That is, the first optical wavelength multiplexing transmission apparatus 10 lying on the up upstream-side outputs an up OSC light including an output monitor value of an up main signal light and an output monitor value of an up OSC light to the second optical wavelength multiplexing transmission apparatus 20 lying on the up downstream-side (up sub-signal light outputting step).

Furthermore, the optical wavelength multiplexing transmission apparatus 20 receives the up OSC light to extract an up OSC light reception value related to the output monitor value of the up main signal light and the output monitor value of the up OSC light from that up OSC light (up sub-signal light receiving step).

Still furthermore, an up OSC light input level and up main signal light input level received by the optical amplifier 21a of the optical wavelength multiplexing transmission apparatus 20, an expected value of the up main signal light input level to the optical amplifier 21a and information on a difference between an up main signal input to the optical amplifier 21a and an optical input level actually inputted are transmitted through the third control unit 22b to the transmission line 51b in a state inserted into an down OSC light in the opposite direction (W→E direction). That is, the second optical wavelength multiplexing transmission apparatus 20 detects the input monitor value of the received up main signal light and the input monitor value of the received up OSC light (input optical level detecting step).

Moreover, the optical wavelength multiplexing transmission apparatus 20 transmits, to the first wavelength multiplexing transmission apparatus 10, the detected up main signal light input monitor value, the detected up OSC light input monitor value, the extracted up OSC light reception value, the expected value of the input level of the up main signal light to the optical amplifier and the difference information between the input level of the up main signal light to the optical amplifier and the input level actually inputted in a state inserted into a down OSC light (turn information transmitting step).

On the other hand, in the optical wavelength multiplexing transmission apparatus 10, a wavelength-multiplexed light from the transmission line 51b is feedback-transferred through the fourth control unit 12b to the first control unit 12a. Moreover, through the use of this feedbacked information, the first control unit 12a calculates a transmission line loss of the transmission line 51a (E→W) on the basis of a difference between an output level of an up OSC light outputted from the optical wavelength multiplexing transmission apparatus 10 and an optical input level received in the optical wavelength multiplexing transmission apparatus 20.

In addition, the first control unit 12a makes a coarse adjustment on an up main signal light output control value for the optical amplifier 11a on the basis of the transmission line loss calculated from the up OSC light and the down OSC light, and activates the optical amplifier 11a. When the optical amplifier 11a is activated to input an up main signal light to the optical amplifier 21a of the optical wavelength multiplexing transmission apparatus 20, the first control unit 12a makes a correction on an output value from a local optical amplifier 11a on the basis of an expected value of an up main signal light input level to the optical amplifier 21a of the optical wavelength multiplexing transmission apparatus 20 to make a fine adjustment on the output level.

Still additionally, the first optical wavelength multiplexing transmission apparatus 10 calculates a transmission line loss on the basis of the transmitted information and a difference between a reception level of a down OSC light and an output level of the down OSC light (loss calculating step), and the first wavelength multiplexing transmission apparatus 10 makes a correction on the output level of an up main signal light on the basis of the transmission line loss (adjusting step).

Thus, since the transmission level adjustment is made through the use of an OSC light irrespective of the passing of a main signal light, as compared with a method in which an automatic adjustment on an optical level is made through the use of a main signal light itself, it is possible to achieve the quick restoration from troubles such as the shutdown of a main signal light. Moreover, the optical level is automatically adjustable in this way.

Furthermore, referring to FIGS. 2 and 3, a description will be given hereinbelow of a case in which the aforesaid optical wavelength multiplexing transmission apparatus 10, 20 operates as a WDM terminal station. In this case, as one example, let it be assumed that the number of wavelengths to be multiplexed is eight.

Figure 2:
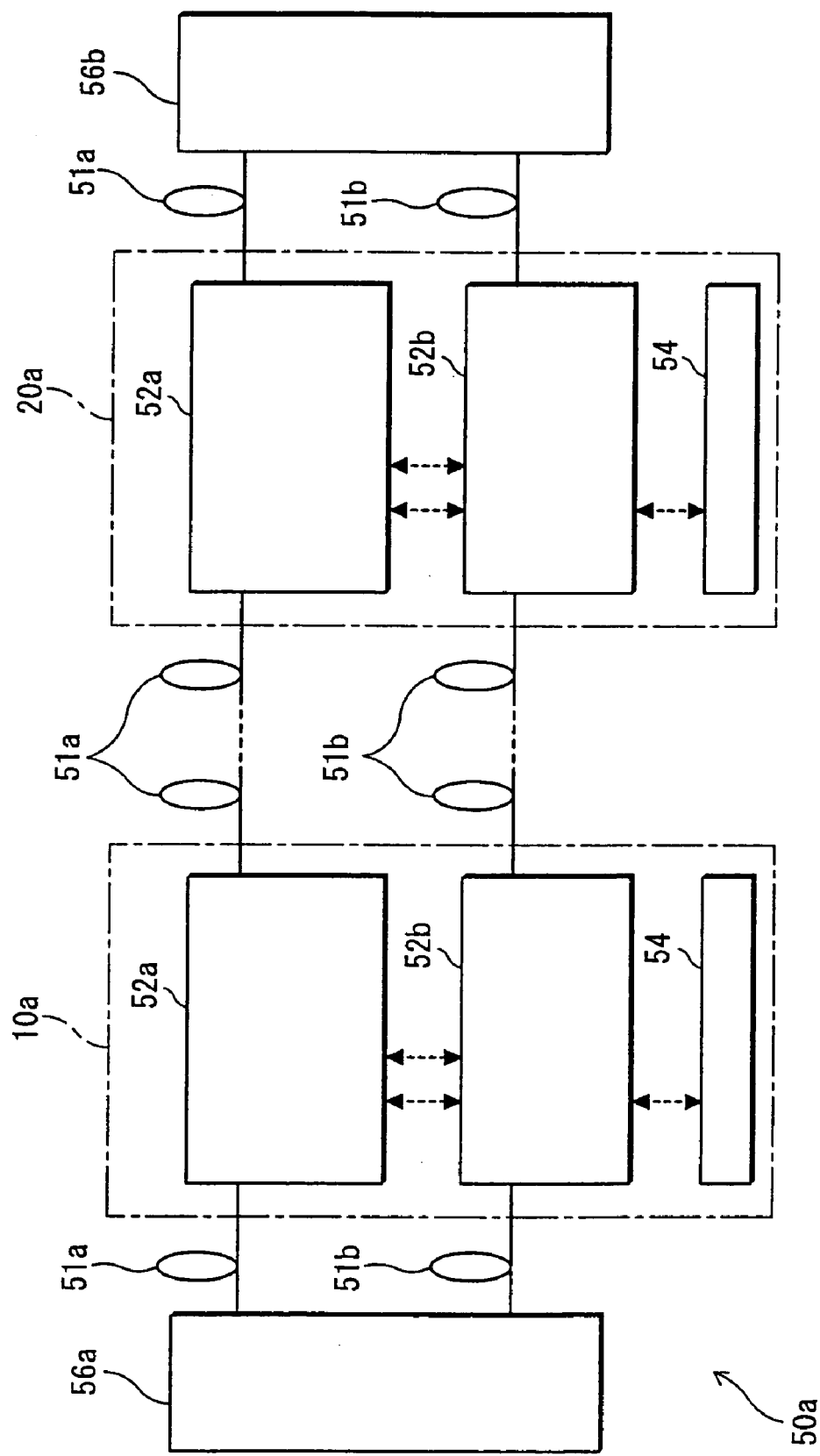
FIG. 2 is an illustration of a configuration of an optical wavelength multiplexing transmission system according to a first embodiment of the present invention.

FIG. 2 is an illustration of a configuration of an optical wavelength multiplexing transmission system according to the first embodiment of the present invention. In FIG. 2, an optical wavelength multiplexing transmission system 50a is similar to the foregoing optical wavelength multiplexing transmission system 50, and is equipped with WDM terminal stations (optical wavelength multiplexing transmission apparatus) 10a, 20a and exchanges 56a, 56b. These exchanges 56a and 56b are connected to each other through an optical fiber, and information data are interchanged through the WDM terminal stations 10a and 20a.

Figure 3:
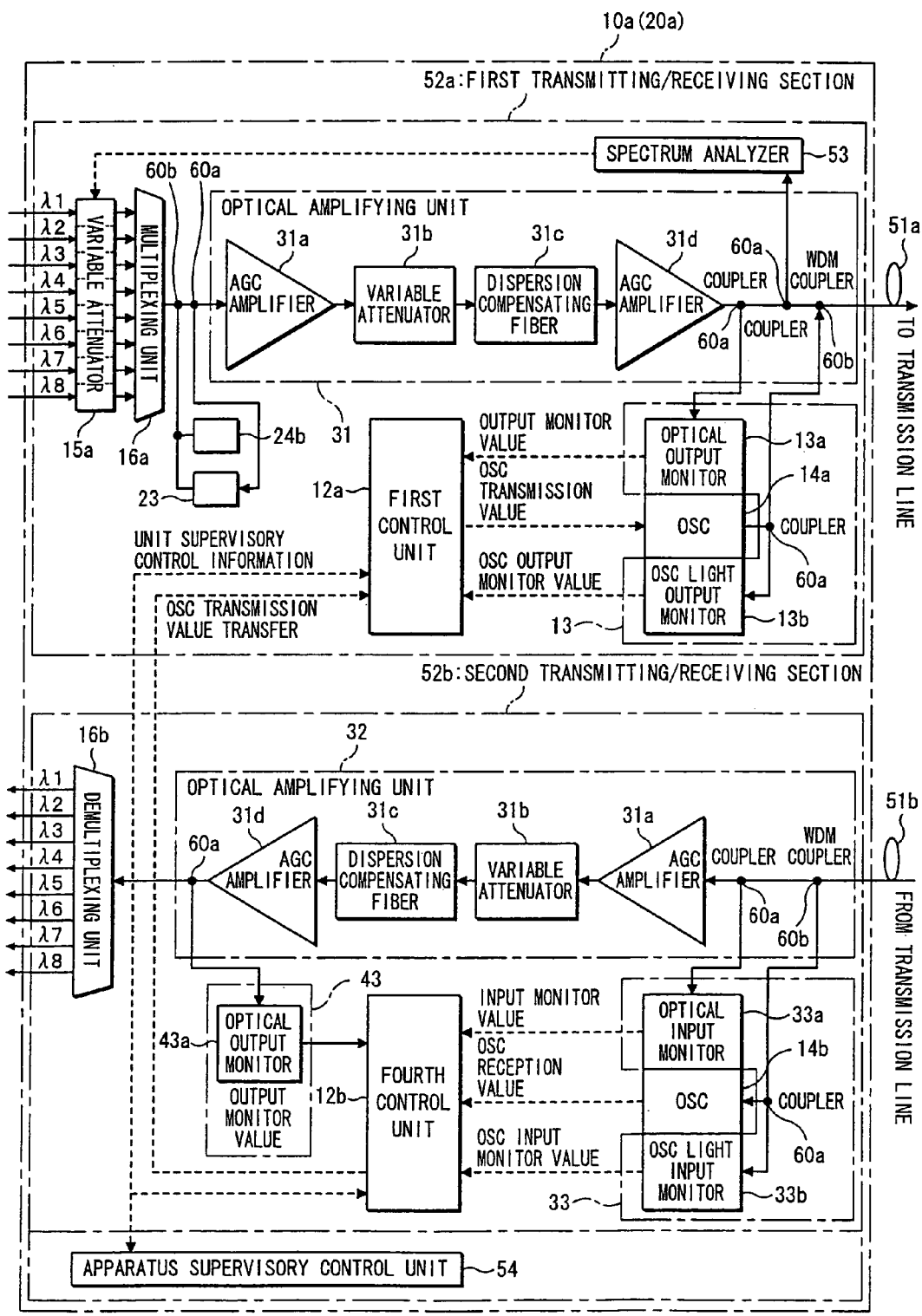
FIG. 3 is a block diagram showing a WDM terminal station according to the first embodiment of the invention.

FIG. 3 is a block diagram showing a WDM terminal station according to the first embodiment of the present invention. In FIG. 3, the WDM terminal station 10a is a terminal station for transmission and reception, and is made up of a first transmitting/receiving section 52a, a second transmitting/receiving section 52b and an apparatus supervisory control unit 54.

The first transmitting/receiving section 52a is for amplifying a wavelength-multiplexed light from an up upstream-side station (exchange 56a) to output it to an up downstream-side station (which signifies a repeater station, not shown), and is composed of a variable attenuator 15a, a multiplexing unit 16a, an up main signal light amplifying unit 31, an up output monitoring unit 13, an up OSC light transmitting unit 14a, a first control unit 12a, a spectrum analyzer 53, an up OSC light receiving unit 24b and an up input monitoring unit 23.

In this configuration, the variable attenuator 15a is for attenuating each of the wavelength components of a wavelength-multiplexed light transmitted, and is put to use for adjusting an optical level for each wavelength of the wavelength-multiplexed light. The multiplexing unit 16a is connected to the variable attenuator 15a for multiplexing single-wavelength lights outputted from the variable attenuator 15a.

Moreover, the up main signal light amplifying unit 31 is for amplifying a wavelength-multiplexed up main signal light to be transmitted to an up downstream-side station, and is composed of a former-stage AGC amplifier 31a, a latter-stage AGC amplifier 31d, a variable attenuator 31b, a dispersion compensating fiber 31c, two couplers 60a and a WDM coupler 60b. Still moreover, the up main signal light amplifying unit 31 is connected to the multiplexing unit 16a for amplifying and outputting a wavelength-multiplexed light.

The former-stage AGC amplifier 31a is an amplifier capable of setting its amplification gain variably, and its function is realizable with, for example, an EDFA (Erbium-Doped Fiber Amplifier). The latter-stage AGC amplifier 31d is constructed similarly thereto.

The variable attenuator 31b is for attenuating and outputting an optical level from the former-stage AGC amplifier 31a, and the attenuation quantity is determined on the basis of an output control signal from the first control unit 12a. The total optical output level is adjusted by this variable attenuator 31b. Incidentally, the same device can be used for both the variable attenuator 31b and variable attenuator 15a. Moreover, the dispersion compensating fiber 31c is an optical fiber made to compensate for dispersion occurring in a transmission line.

The first control unit 12a is connected to the up main signal light amplifying unit 31 and the up OSC light transmitting unit 14a for calculating a loss on the basis of an output level of an up main signal light and a reception level of an up OSC light received by an up downstream-side station (not shown) to correct the output level of the up main signal light and for inputting the output level of the up OSC light and the output level of the up main signal light to the up OSC light transmitting unit 14a.

In FIG. 3, the same reference numerals as those used above represent the same or similar parts, and the further description thereof will be omitted.

Furthermore, referring to FIGS. 4 and 5, a description will be given hereinbelow of an operation of the WDM coupler 60b in this up main signal light amplifying unit 31.

Figure 4:
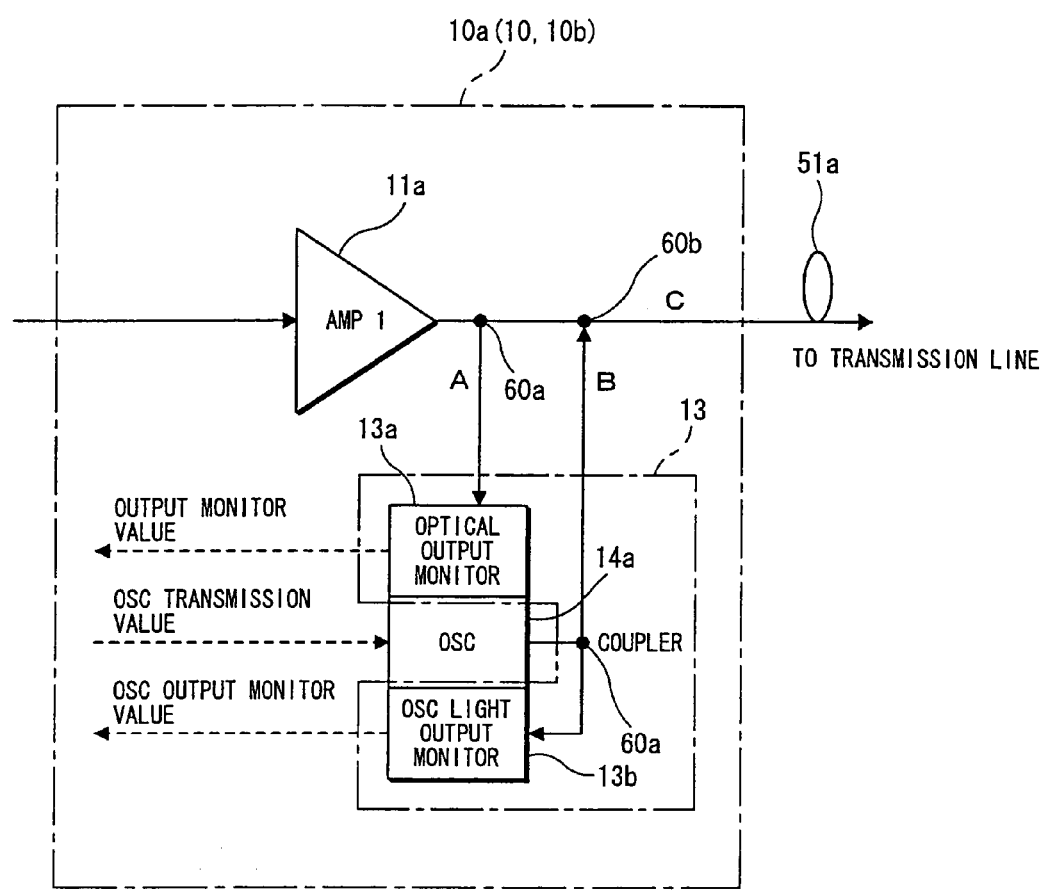
FIG. 4 is an illustration of an example of an operation of a WDM coupler on a transmission side.
Figure 5A:
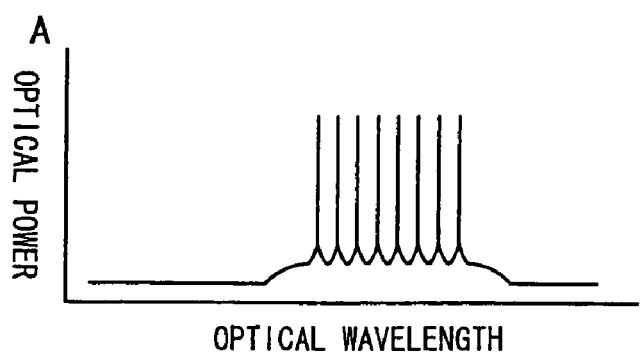
FIGS. 5(a) to 5(c) are illustrations of optical spectrums to be transmitted.
Figure 5B:
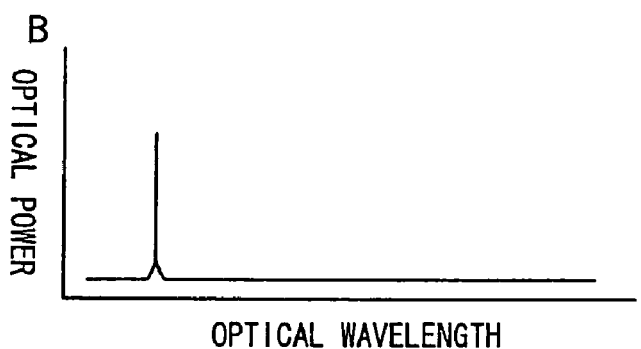
Figure 5C:
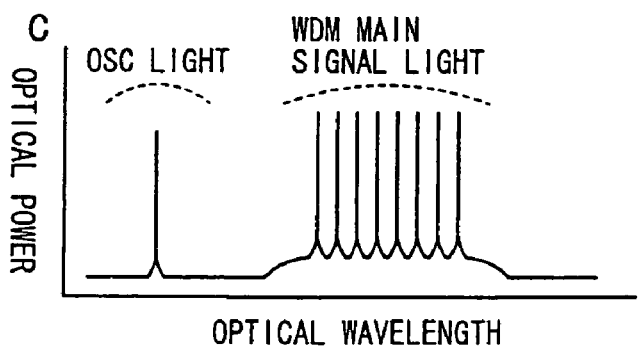

FIG. 4 is an illustration of an example of an operation of the WDM coupler 60b, and FIGS. 5(a) to 5(c) are illustrations of optical spectrums to be transmitted. An up main signal light transmitted from the optical amplifier 11a shown in FIG. 4 is wavelength-multiplexed with an up OSC light in the WDM coupler 60b and sent to the transmission line 51a. An optical spectrum at a place indicated by A on the output side of the optical amplifier 11a in FIG. 4 becomes as shown in FIG. 5(a). That is, the up optical output monitoring unit 13a does not measure the level of the up OSC light but measures only the level of the up main signal light.

In addition, an optical spectrum at a place indicated by B in FIG. 4 becomes as shown in FIG. 5(b), and the up OSC output monitoring unit 13b measures only an up OSC light component as a monitor value.

This up OSC light signal has a wavelength different from that of the up main signal light, and since it does not pass through the optical amplifier 11a, the transmission/reception thereof can be made regardless of a state of the up main signal light, and without receiving the influence of the passing of the up main signal light, a supervisory control optical channel or the like is used as a pilot light. The transmission/reception is made using a light with a wavelength of 1510 nm (n signifies $10^{-9}$) 1.5 Mbps-CMI-coded (Coded Mark Inversion Codes). This CMI codes are such that an input "0" is allocated to "01" and an input "1" is alternately allocated to "00" and "11". Moreover, for a design of an optical amplifier (for example, the optical amplifier 11a), optical devices (optical transceivers) to be used for 1.5-Mbps transmission are made to accomplish transmission/reception of a wavelength-multiplexed light even in an amplification range in which the optical amplifier cannot operate normally, in a manner that a system gain exceeding a transmission/reception level difference is given.

In this connection, the down main signal light wavelength and the down OSC light wavelength are similar to the up main signal light wavelength and the up OSC light wavelength, respectively. Moreover, each of the up OSC light signal and the down OSC light signal is terminated in each of the repeating sections. That is, for example, between a terminal station transmitting unit and a repeater receiving unit, between a repeater transmitting unit and a repeater receiving unit, or between a repeater transmitting unit and a terminal station receiving unit, each OSC light is terminated, and it is produced using an independent local clock in each repeating section.

Figures 6A, 6B:
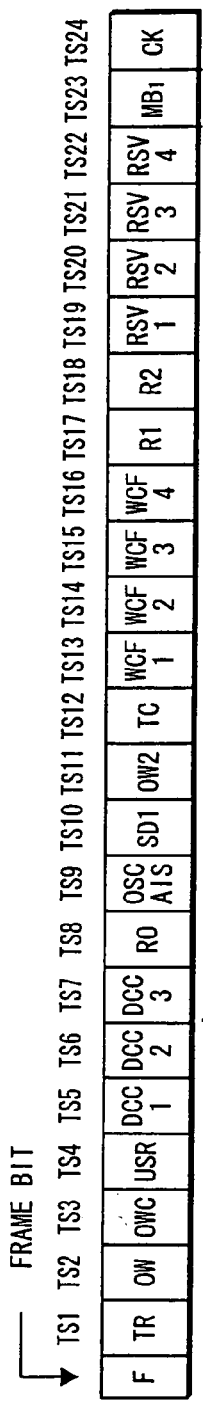
FIGS. 6(a) and 6(b) are illustrations of frame formats of OSC light.

FIGS. 6(a) and 6(b) illustrate an OSC light frame format, and show one example of a frame format to be transmitted/received between WDM terminal stations or between linear repeaters. The frame shown in FIG. 6(a) is configured as 24 time slot multiframe from TS (Time Slot) 1 to TS24. The meanings of the brevity codes expressed in the respective frames are as shown in FIG. 6(b). For example, OSCAIS written in TS9 represents a channel (Ch) for an optical amplifier (AMP) control.

Moreover, TS23 of the frame shown in FIG. 6(a) includes information called multibyte (MB), and when this MB is transmitted 24 times, $MB_1$ to $MB_{24}$ are put together on the reception side to incorporate a sub-frame.

FIGS. 7(a) and 7(b) are illustrations of a configuration of a sub-frame. Concretely, FIG. 7(a) shows a configuration of $MB_1$ to $MB_{24}$ using TS23, and FIG. 7(b) illustrates the contents stored in the sub-frame. For example, MB12 and MB13 denote OPTOUT1 and OPTOUT2, respectively, which represent an up (E→W) direction main signal light output monitor value and a down (W→E) direction main signal light output monitor value, respectively. Moreover, the pair of OPTOUT1 and OPTOUT2 correspond to the pair of up and down.

Thus, on the sub-frame, the transmission/receive optical level of up and down OSC lights or main signals, an expected value of a main signal light input level to an optical amplifier (for example, the optical amplifier 11a) and difference information between the expected value and a wavelength-multiplexed light actually inputted are transferred. Moreover, for the optical level, dBm expression coded according to a bipolar format is put to use.

In addition, the spectrum analyzer 53 (see FIG. 3) is placed on the output side of the latter-stage AGC amplifier 31d for displaying a spectrum of a wavelength-multiplexed light. A manager can adjust the attenuation quantity of the variable attenuator 15a by seeing the spectrum displayed. That is, this spectrum analyzer 53 is used only to detect the variation of the optical output level for every optical wavelengths λ1 to λ8 for controlling the variable attenuator 15a.

Accordingly, in FIG. 3, a wavelength-multiplexed light outputted from the latter-stage AGC amplifier 31d of the up main signal light amplifying unit 31 is branched by the coupler 60a, with one wavelength-multiplexed light being monitored by the up output monitoring unit 13. The other wavelength-multiplexed light is again branched by the coupler 60a so that the spectrum analyzer 53 displays its spectrum. The attenuation quantity of the variable attenuator 15a is controlled through the use of the spectrum. Moreover, in the WDM coupler 60b of the optical amplifier 31, the aforesaid wavelength-multiplexed light is coupled with a wavelength-multiplexed light from the up OSC light transmitting unit 14a, and then outputted to the transmission line 51a.

In addition, the first control unit 12a receives an output monitor value from the up optical output monitoring unit 13a of the up output monitoring unit 13, an up OSC light output monitor value from the up OSC output monitoring unit 13b and an OSC transmission value from the fourth control unit 12b of the second transmitting/receiving section 52b which will be described layer to output an output control signal to the variable attenuator 31b on the basis of these values. Moreover, the first control unit 12a is connected to the fourth control unit 12b and the apparatus supervisory control unit 54 which will be mentioned later, for transmitting and receiving unit supervisory control information about each of modules provided in this WDM terminal station 10a.

In the first transmitting/receiving section 52a, the parts marked with the same reference numerals as those used above fulfill the same or similar functions, and the further description thereof will be omitted.

Furthermore, the second transmitting/receiving section 52b is made up of a down main signal light amplifying unit 32, a down input monitoring unit 33, a down output monitoring unit 43 (down optical output monitoring unit 43a) the fourth control unit 12b and a demultiplexing unit 16b.

The down main signal light amplifying unit 32 is for amplifying a wavelength-multiplexed down main signal light to be transmitted to a down downstream-side station, and is composed of a former-stage AGC amplifier 31a, a latter-stage AGC amplifier 31d, a variable attenuator 31b, a dispersion compensating fiber 31c, two couplers 60a and a WDM coupler 60b. These are the same as those of the up main signal light amplifying unit 31, and the further description thereof will be omitted.

Still furthermore, referring to FIGS. 8 and 9, a description will be given hereinbelow of an operation of the coupler 60a on the reception side.

Figure 8:
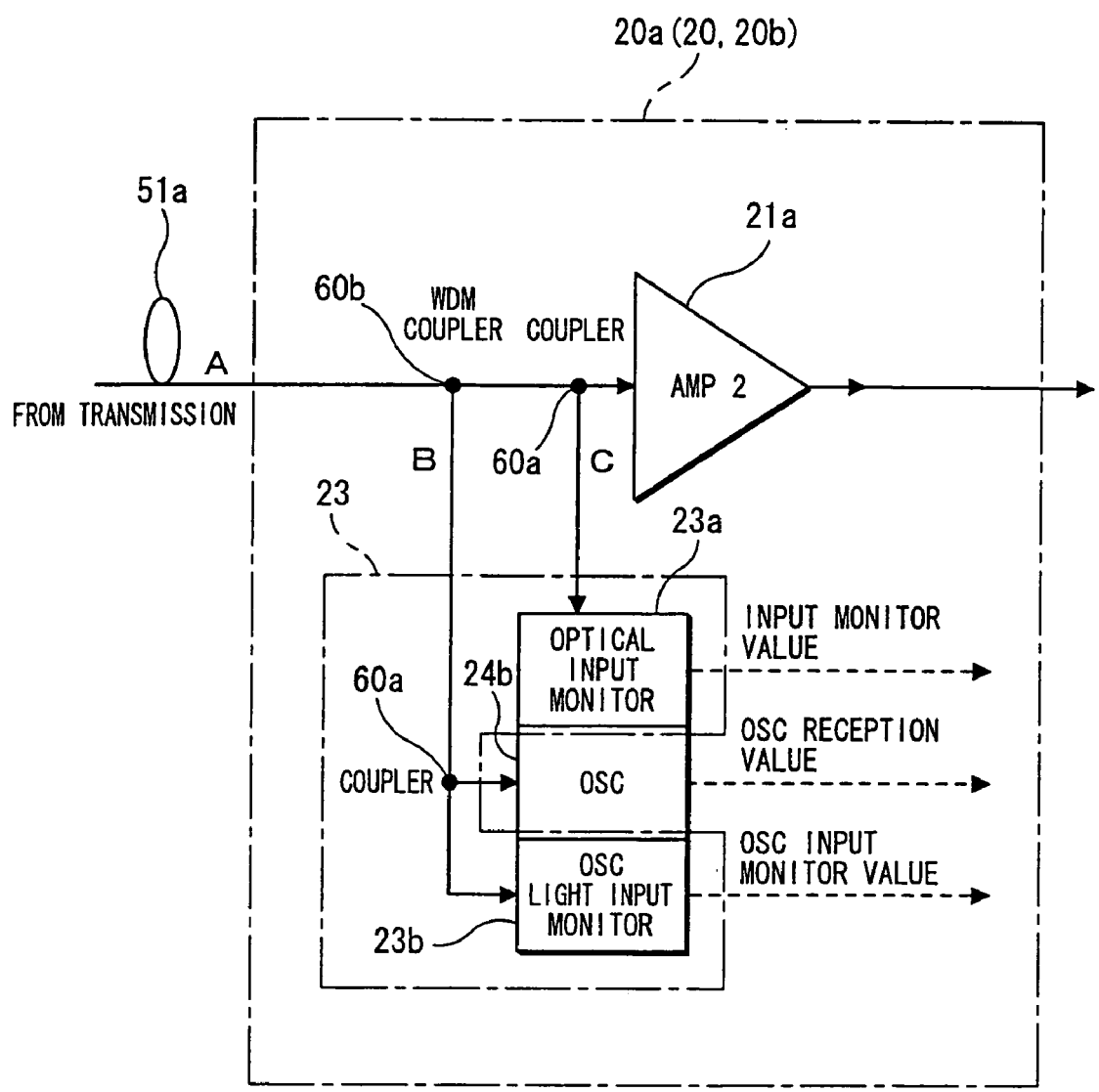
FIG. 8 is an illustration of an example of an operation of a WDM coupler on a reception side.
Figure 9A:
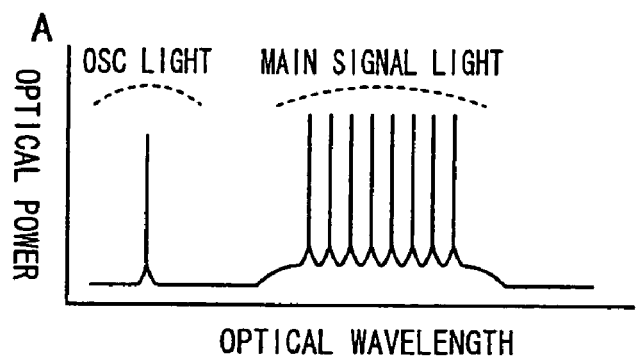
FIGS. 9(a) to 9(c) are illustrations of optical spectrums.
Figure 9B:
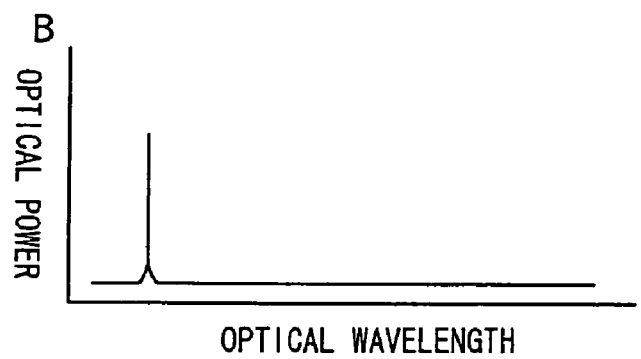
Figure 9C:
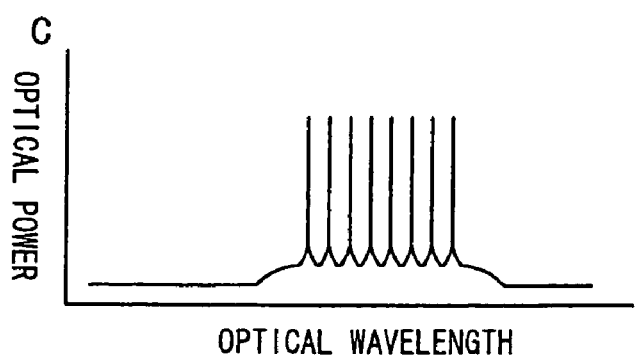

FIG. 8 is an illustration of an example of an operation of the WDM coupler 60b on the reception side, and FIGS. 9(a) to 9(c) are illustrations of optical spectrums. An optical spectrum at a place indicated by A in the transmission line 51a includes an up main signal light and an up OSC light as shown in FIG. 9(a), and a wavelength-multiplexed light including these lights is inputted to the WDM terminal station 20a.

Only the up OSC light is demultiplexed from the wavelength-multiplexed light by the WDM coupler 60b of the WDM terminal station 20a, and the demultiplexed light is transmitted to the up OSC light receiving unit 24b and the up input monitoring unit 23a. Moreover, an optical spectrum at a place indicated by B in FIG. 8 becomes as shown in FIG. 9(b) and an optical spectrum at a place indicated by C in FIG. 8 becomes as shown in FIG. 9(c). That is, in the up OSC light receiving unit 24b, only the optical level on the up OSC light wavelength component is monitored, while in the up optical input monitoring unit 23a, only the optical level on the up main signal light wavelength component is monitored.

The down main signal light and the down OSC light are similar thereto, and the description thereof will be omitted for avoiding the duplication.

As mentioned above, the main signal light and OSC light included in the wavelength-multiplexed light are separated through the WDM coupler 60b and the coupler 60a.

Referring again to FIG. 3, the down input monitoring unit 33 has a function to extract input levels of a down main signal light and a down OSC light inputted from a down upstream-side station, and is composed of a down optical input monitoring unit 33a, a coupler 60a and a down OSC light input monitoring unit 33b.

In this arrangement, the down optical input monitoring unit 33a is constructed similarly to the up optical output monitoring unit 13a, and is connected to the coupler 60a of the down main signal light amplifying unit 32 for measuring an input level of a down main signal light, inputted, to output this level as an input monitor value. The down OSC light input monitoring unit 33b is for measuring a level of a down OSC light in a branched wavelength-multiplexed light coming from the WDM coupler 60b of the down main signal light amplifying unit 32 through the coupler 60a and further for outputting this level as an OSC input monitor value. These functions are realizable with, for example, a photo-diode.

The demultiplexing unit 16b is for demultiplexing a wavelength-multiplexed light outputted from the down main signal light amplifying unit 32 into single wavelength lights with optical wavelengths λ1 to λ8 to output them.

The fourth control unit 12b is connected to the down OSC light receiving unit 14b, the down output monitoring unit 43 and the down main signal light amplifying unit 32 for outputting a reception level of an up main signal light received by a down upstream-side station, a reception level of an up OSC light received by the down upstream-side station, an expected value of an input level of an up main signal light amplified by the down upstream-side station and information on a difference between an input level of the up main signal light amplified by the down upstream-side station and an input level of an up main signal light actually inputted.

The fourth control unit 12b is made to calculate a loss on the basis of an output level of a down main signal light and an input level of a down OSC light for correcting the output level of the down main signal light in accordance with an output control signal.

In other words, the loss calculation in the fourth control unit 12b is made as a function of an input monitor value inputted from the down optical input monitoring unit 33*a* and a down OSC light input monitor value from the down OSC light input monitoring unit 33*b*.

In addition, the fourth control unit 12*b* is designed to transfer an OSC transmission value representative of an output optical level of the up OSC light transmitting unit 14*a* to the first control unit 12*a* of the first transmitting/receiving section 52*a*.

Still additionally, the apparatus supervisory control unit 54 is for controlling and supervising, in addition to the first transmitting/receiving section 52*a* and the second transmitting/receiving unit 52*b*, operational states of other components. For example, this control is implemented with respect to the output levels or the like of the optical amplifiers 31*a* and 31*d* according to the number of wavelengths, and the supervision is made with respect to the optical input levels and optical output levels of the optical amplifiers 31*a*, 31*d* and the currents, temperatures, power and others of excitation lasers of the optical amplifiers 31*a*, 31*d*.

Of parts other than these, the same reference numerals as those used above represent the same or similar parts, and the further description will be omitted.

Accordingly, lights with optical wavelengths λ1 to λ8, to be wavelength-multiplexed, are inputted to the first transmitting/receiving section 52*a*, and the inputted wavelength-multiplexed lights λ1 to λ8 are transmitted through the variable attenuator 15*a*, for smoothing the variation of the optical output value occurring at every wavelength, to the multiplexing unit 16*a*. A wavelength-multiplexed light produced by the wavelength multiplexing in the multiplexing unit 16*a* is sent to the up main signal light amplifying unit 31, and this up main signal light amplifying unit 31 compensates for a drop of an optical level in the variable attenuator 15*a* and the multiplexing unit 16*a* on the way and optically amplifies the wavelength-multiplexed light up to an appropriate level in the transmission line 51*a* or the like.

On the other hand, in the second transmitting/receiving unit 52*b*, with respect to a wavelength-multiplexed light from the transmission line 51*b*, the down main signal light amplifying unit 32 compensates for a drop of an optical level in the transmission line 51*b*, and then transmits the wavelength-multiplexed light to the demultiplexing unit 16*b*. This demultiplexing unit 16*b* demultiplexes the wavelength-multiplexed light to separately output the original single wavelength lights.

Moreover, the input levels of a down OSC light and a down main signal light received from the transmission line 51*b* are monitored and transmitted to the fourth control unit 12*b*. Following this, the transmission side first control unit 12*a* transmits an expected value of a down main signal light input level for the down main signal light amplifying unit 32 and information on a difference between this expected value and an actual down main signal light input level to the opposed side through the use of an up OSC light.

As described above, a transmission line loss in an optical transmission line is calculated from an output level of an OSC light, forming a supervisory control channel, having a wavelength different from that of a main signal light and an optical input level to calculate an appropriate output level of a main signal light.

In addition, an optical input level of a main signal light on the reception side and difference information on a reception level expected value the reception side requires are transferred to the transmission side so that a correction in a preset limited range is made on the optical output level calculated from the transmission line loss calculated from a difference between the transmission and reception levels of an OSC light.

With the above-described configuration, a sequence classified into the following (I) to (IV) is implemented between a WDM terminal station and a repeater. Referring to FIGS. 10 to 13, a description will be given hereinbleow of the sequence in each of states: an initial adjustment state, a disconnected state of a transmission line and a controlled state of an output of an optical amplifier.

In addition, a similar sequence is carried out in the aforesaid optical wavelength multiplexing transmission apparatus 10, 20 and in linear repeaters 10*b*, 20*b* which will be described later. Although the description will mainly be given of an up main signal light and an up OSC light, the sequence for a down main signal light and a down OSC light are totally the same, and the description thereof will be omitted for avoiding the duplication. Moreover, in these figures, the OSC light transmitting/receiving unit, the first control unit 12*a* for the optical amplifier, and others will be omitted from illustrations.

(I) About Transmission Line Disconnection State (Transmission Line Non-Connection state)

FIG. 10 is an illustration for explaining an operation in a transmission line disconnection state according to the first embodiment of the present invention. This state is a non-connection state of a wavelength-multiplexed light in the transmission line 51*a*, 51*b* between the optical amplifier 11*a* and the optical amplifier 21*a*. First, in the WDM terminal station 20*a* side, upon detection of an input shutdown (OSCINDWN) of an up OSC light, the optical amplifier 25*a* transfers a prescribed code (F000h) indicative of OSCINDWN as OSCIN (OSC input level monitor value) through the transmission line 51*b* to the WDM terminal station 20*b* side through the use of a down OSC light in the opposite direction. In this case., OSCIN and OSCINDWN are made to be stored in a sub-frame shown in FIGS. 7(*a*) and 7(*b*). Incidentally, h(hex) represents the hexadecimal.

In addition, the opposed side optical amplifier 11*a* receives a code representative of OSCINDWN as OSCIN, and detects a non-connection of the transmission line 51*a* and puts the optical amplifier 11*a* into a shutdown state. This shutdown signifies the stopping of a main signal light output of the optical amplifier 11*a*.

(II) About Transmission Line Loss

Calculation State (Coarse Adjustment of Optical Output Level)

Figure 11:
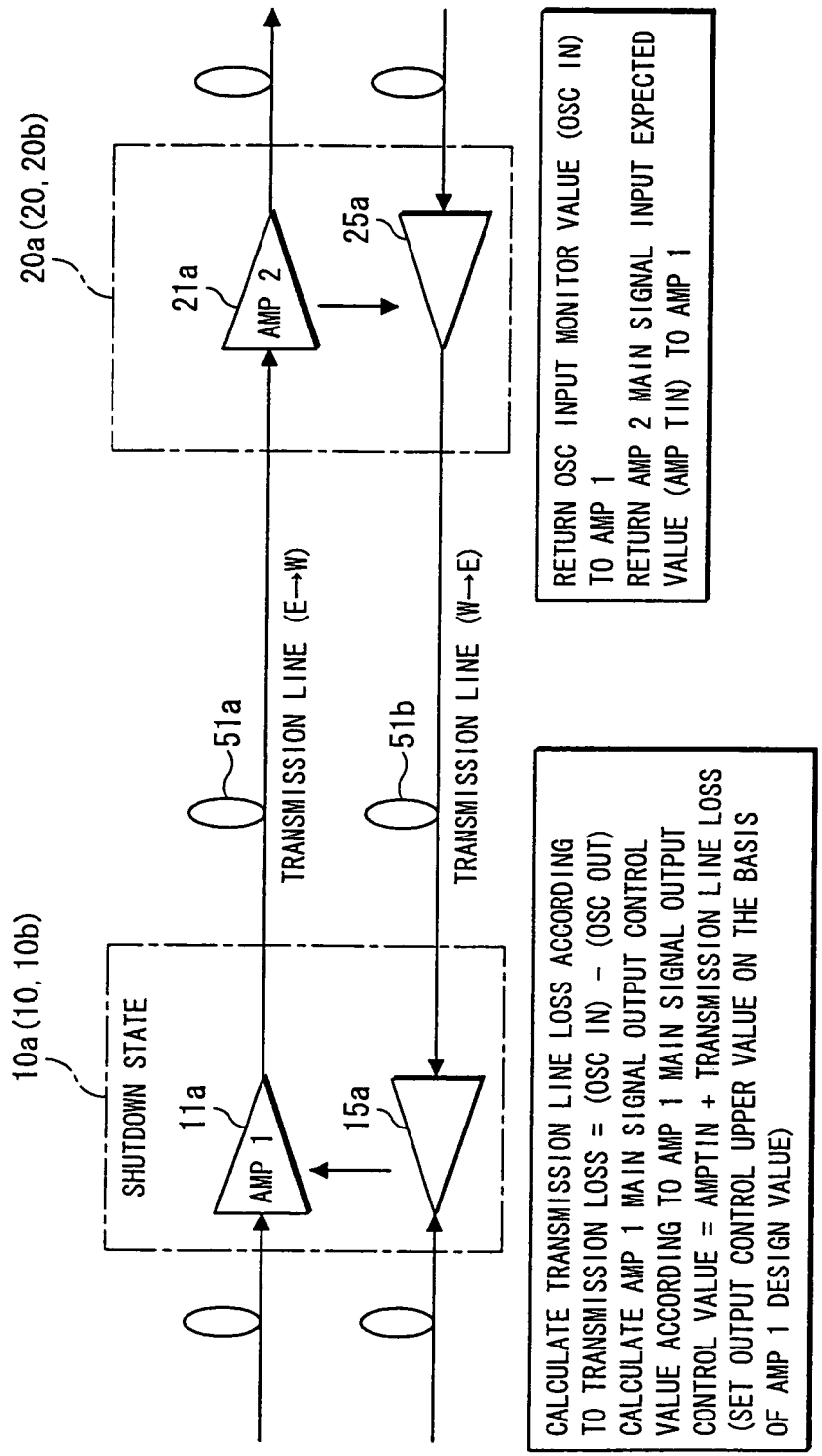
FIG. 11 is an illustration for explaining an operation in a transmission line loss calculation state in the first embodiment of the present invention.

FIG. 11 is an illustration for explaining an operation in a transmission line loss calculation state according to the first embodiment of the present invention.

In this state, the transmission line 51*a* is connected between the optical amplifier 11*a* and the optical amplifier 21*a* to make the passing (communication state) of an up OSC light between the optical amplifier 11*a* and the optical amplifier 21*a*. Moreover, an down OSC input level (OSCIN) received by the optical amplifier 21*a* and an up main signal light input level expected value (AMPTIN) of the optical amplifier 21*a* are transferred to the optical amplifier 11*a* through the use of an opposite-direction (W →E direction) down OSC light.

In addition, in the WDM terminal station 10*a*, a transmission line loss (OSC light transmission line loss) between the optical amplifier 11*a* and the optical amplifier 21*a* is calculated as a function of a difference between a down OSC light output level and an up OSC input level in the optical amplifier 21*a* transferred through a down OSC light according to an equation (1).

$$OSC \text{ Light Transmission Line Loss} = OSCIN - OSCOUT \quad (1)$$

This optical fiber transmission line loss depends upon optical lengths, and the transmission line loss difference between an OSC light and a main signal light depending on the wavelength dependency of the transmission line loss assumes an eigen value according to a type of an optical fiber. The optical fiber type signifies the kind of a fiber, such as single mode fiber or multimode fiber.

Thus, in the first control unit 12*a*, for the calculation of a transmission line loss, through the use of an up OSC light and a down OSC light, a value to be obtained by multiplying a transmission loss by a constant is calculated as an up main signal light transmission line loss value according to an equation (2), thereby controlling the optical amplifier 11*a*. In this equation, k represents a constant and the OSC light transmission line loss denotes a transmission line loss calculated from a difference between OSC light transmission and reception optical levels.

$$\text{Main Signal Light Transmission Line Loss} = k \times OSC \text{ Light Transmission Line Loss} \quad (2)$$

Subsequently, according to an equation (3), an up main signal light output level control value to be outputted from the optical amplifier 11*a* is calculated on the basis of the transmission line loss between the optical amplifier 11*a* and the optical amplifier 21*a*, thus obtained, and an up main signal light input level expected value to the optical amplifier 21*a* which is an expected value transferred from the optical amplifier 21*a* to the optical amplifier 11*a*.

$$\text{Optical Amplifier Up Main Signal Light Output Level Control Value} = AMPTIN + \text{Transmission Line Loss} \quad (3)$$

Incidentally, the upper limit of the output control value is set according to a design value of the optical amplifier 11*a*. The optical amplifier 11*a* is put into a shutdown state because an up main signal light is not inputted thereto yet.

(III) About Optical Amplifier Activation/Output Stabilization Waiting State

FIG. 12 is an illustration for explaining an operation in an optical amplifier activation/output stabilization waiting state according to the first embodiment of the present invention. In this state, an up main signal light is inputted to an optical amplifier 11*a* and the optical amplifier 11*a* is activated into an excited state, while the output level is controlled on the basis of the up main signal light output level control value in (II) so that this output level agrees with an up main signal light output level (OPTOUT) forming a control desired value, thus producing a waiting state until the operation becomes stable.

In addition, one of the level value of an up main signal light outputted from the optical amplifier 11*a* and the up main signal light output level value (OPTOUT) calculated in (II) is put under the supervision, and the shifting to the following state. (IV) takes place after a stable condition occurs for a constant period of time.

(IV) About Normal Operation State (Optical Output Level Fine Adjustment)

FIG. 13 is an illustration for explaining an operation in a normal operation state according to the first embodiment of the present invention. This state is an operation state to be ordinarily taken. In this case, the optical amplifier 21*a* transfers five kinds of information to the WDM terminal station 10*a* through the use of an opposite-direction (W→E direction) down OSC light. That is, the five kinds of information are an OSC input monitor value (OSCIN), an up main signal light input monitor value (OPTIN) to the optical amplifier 21*a*, an up main signal light input level expected value (AMPTIN) to the optical amplifier 21*a* and a difference (AMPDIFF) between an up main signal light input level expected value (AMPTIN) to the optical amplifier 21*a* and an actual input level.

On the other hand, the optical amplifier 11*a* implements output control by adding an output correction term to the up main signal light output level control value calculated in (II). This output correction term signifies a term for correcting a minute difference between a transmission line loss calculated from up OSC light transmission and reception levels and a transmission line loss relative to the actual up main signal light. Moreover, this term is incrementally/decrementally controlled according to the AMPDIFF code from the optical amplifier 21*a*. That is, the optical output desired value of the optical amplifier 11*a* is incremented/decremented by the output correction term until the AMPDIFF from the optical amplifier 21*a* falls within a prescribed range.

In addition, since the basic level adjustment is made using a down OSC light in (II), the value of the correction term is limited to approximately several dB. Still additionally, the frequency of the increase/decrease of the correction value is set to a value sufficiently longer than a response time of the ALC control of the optical amplifier 11*a*.

This corrects the up main signal light loss calculation error on an up OSC light and reduces the influence of the disturbance occurring in an up main signal light reception level due to an increase/decrease in number of wavelengths in an up main signal light.

FIG. 14 is an illustration of output control values for an optical amplifier according to the first embodiment of the present invention, and methods of determining output control values for an optical amplifier in an optical amplifier output control sequence are collected therein. That is, the aforesaid four kinds of states (I) to (IV) are allocated to the vertical columns while the control contents are written in horizontal columns.

In addition, in FIG. 14, an output control value for the ALC control of an optical amplifier is determined in accordance with an amplifier (AMP) output control value indicated by circled numeral 8.

Figure 15:
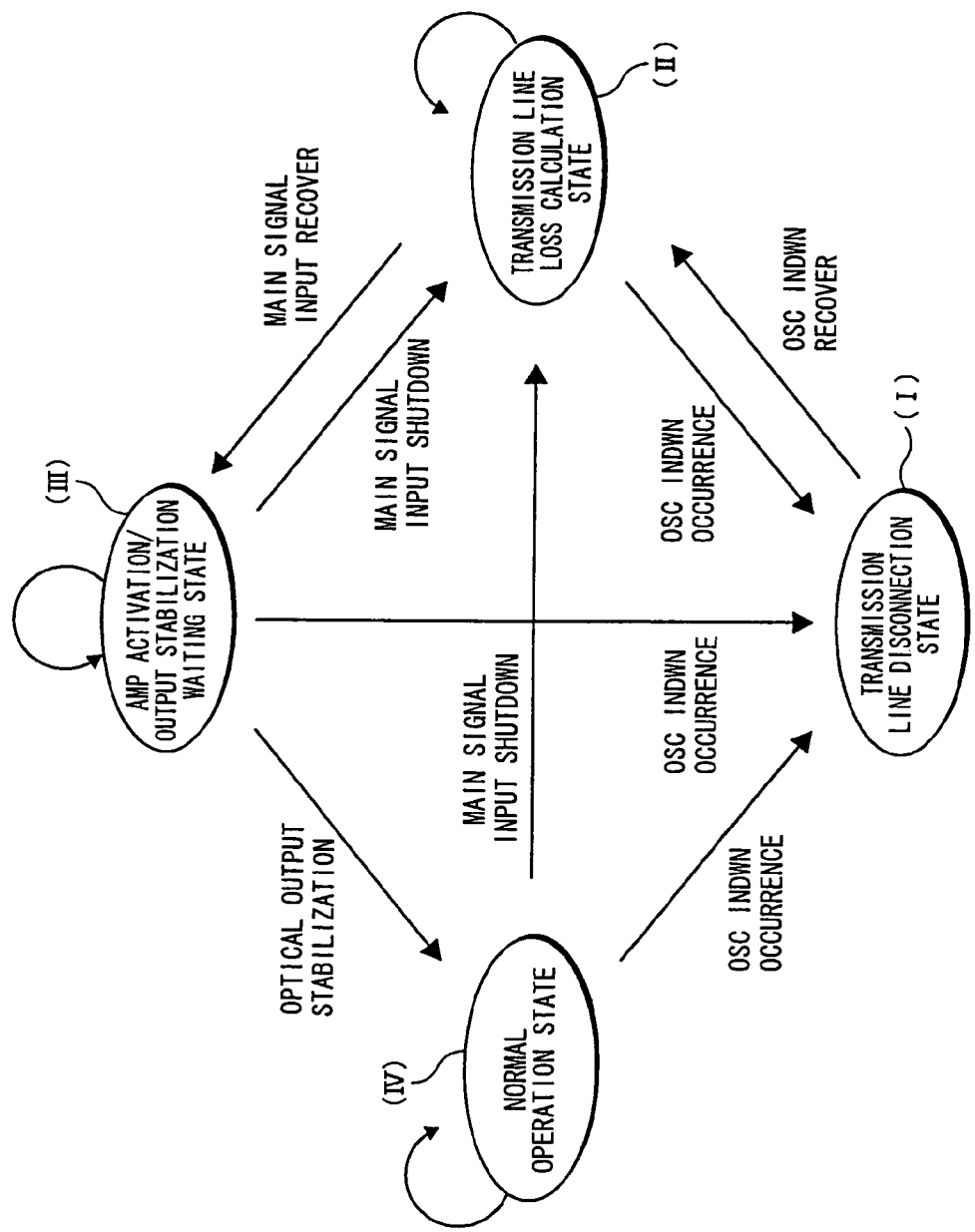
FIG. 15 is an illustration of a state transition of output control of an optical amplifier in the first embodiment of the present invention.

FIG. 15 is an illustration of a state transition of output control of an optical amplifier in the first embodiment of the present invention, and shows the transitions among the states (I) to (IV) in the sequences shown in FIGS. 10 to 14. The transition from the transmission line disconnection state (I) to the normal operation state (IV) takes place through the transmission line loss calculation state (II) and the optical amplifier activation/output stabilization waiting state (III). In each of the states, upon the detection of OSCINDWN, the transmission line disconnection state (I) is made to execute the output control calculation sequence from the beginning. Moreover, in a case in which an up main signal light input is shut down in the normal operation state (IV), the transmission line loss calculation state (II) is set so that an up main signal light input waiting state takes place.

In this connection, the contents shown in FIGS. 14 and 15 are similar to those in other embodiments which will be described later.

As mentioned above, owing to the monitoring of the transmission output levels and reception input levels of a main signal light and an OSC light, the adjustment on the transmission light level can be made using the OSC light regardless of the passing of the main signal light.

Accordingly, in the case of the automatic adjustment of an optical level, it is possible to achieve quicker restoration from troubles such as the shutdown of a main signal light, as compared with a method using only a main signal light.

In addition, as mentioned above, even in the case of a change of the number of wavelengths to be multiplexed in a main signal light, since an OSC light is not affected by the output disturbance of an optical amplifier, stable calculation of an optical output level becomes feasible.

Still additionally, in this way, a signal source for the adjustment of a receive optical level becomes unnecessary at the initial installation and troublesome adjustment becomes unnecessary. Therefore, optical parts such as an optical PAD for the adjustment of the receive optical level become unnecessary, which improves the reliability of transmission lines. Moreover, without re-adjustment, it is possible to cope with a change of a transmission line loss with the passage of time or troubles after the adjustment, or to cope with a change of the transmission line loss resulting from the moving of a WDM terminal station or the like.

(B) Description of Second Embodiment of the Invention

Figure 16:
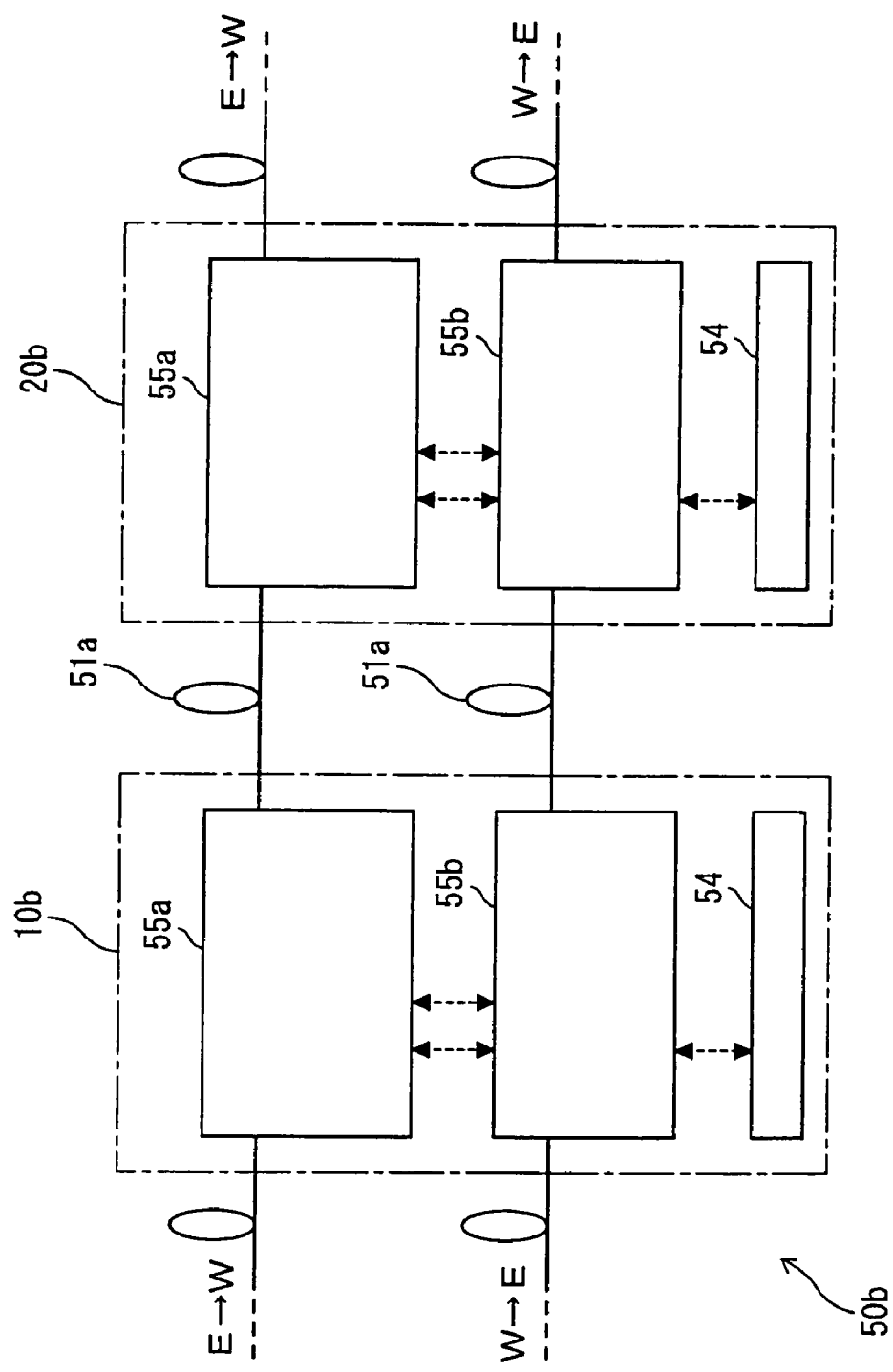
FIG. 16 is an illustration of a configuration of an optical wavelength multiplexing transmission system according to a second embodiment of the present invention.

In a second embodiment, an optical wavelength multiplexing transmission apparatus is designed to function as a linear repeater. FIG. 16 is an illustration of a configuration of an optical wavelength multiplexing transmission system according to the second embodiment of the present invention. In an optical wavelength multiplexing transmission system 50b shown in FIG. 16, a plurality of linear repeaters are connected through optical fiber transmission lines.

Figure 17:
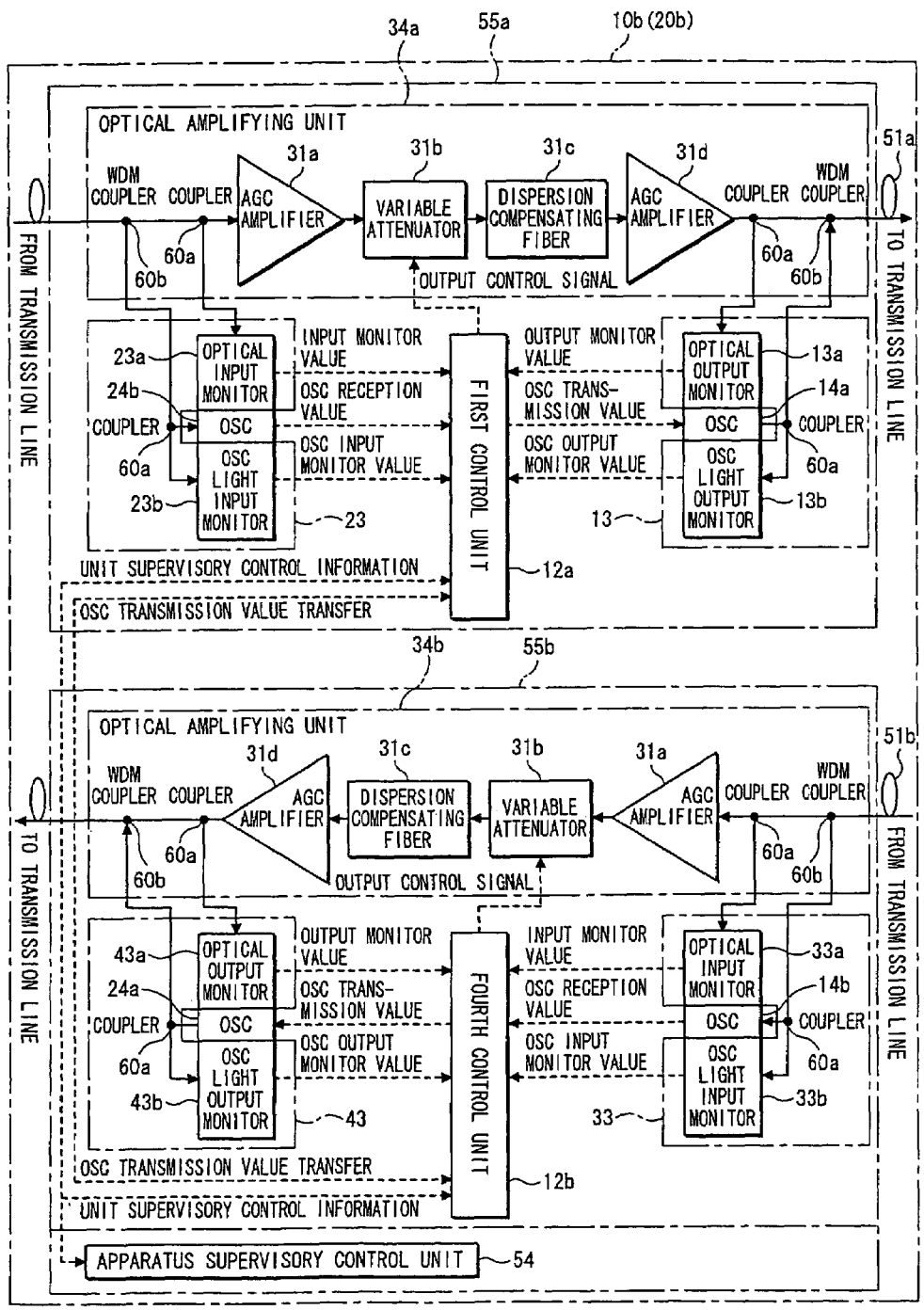
FIG. 17 is a block diagram showing a linear repeater in the second embodiment of the invention.
Figure 18:
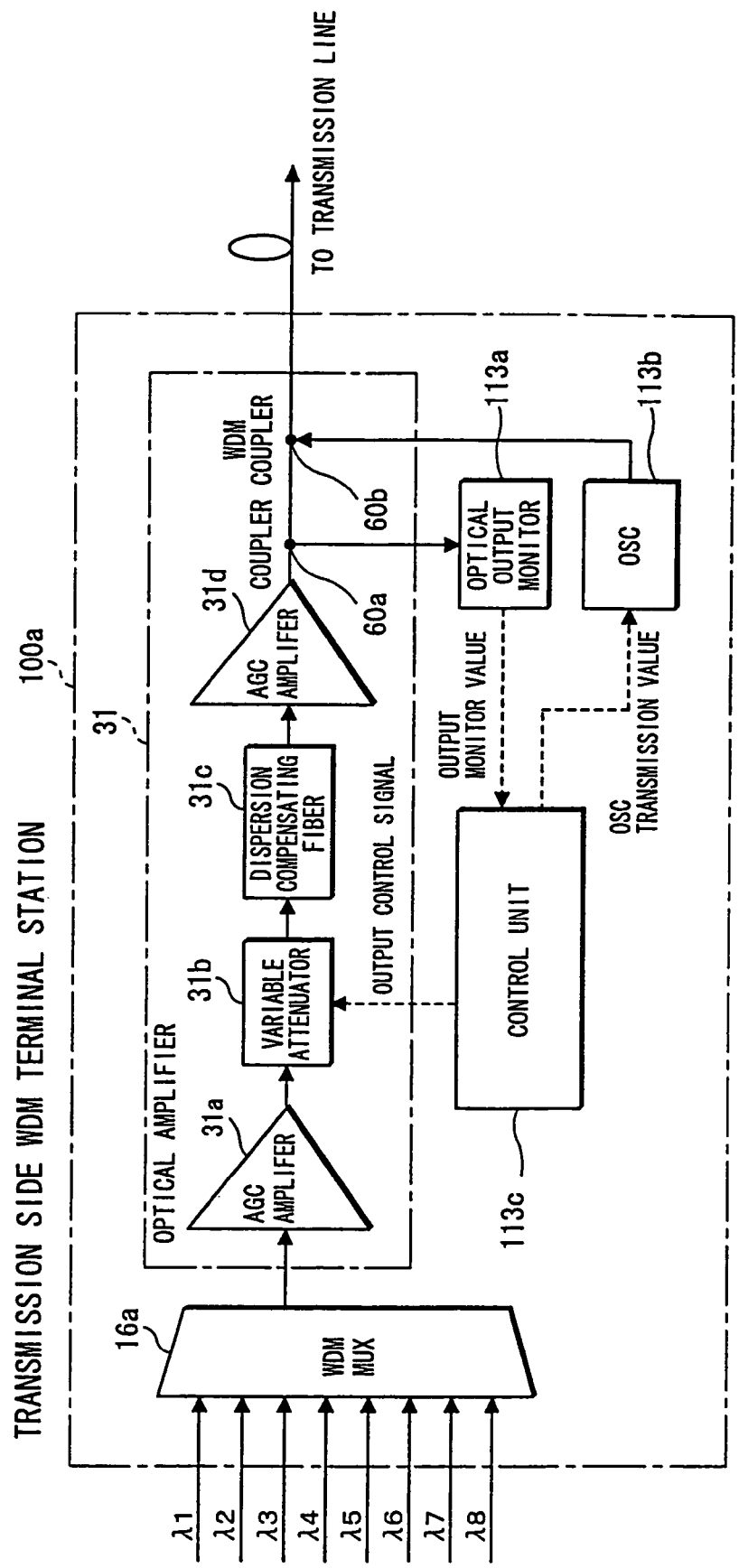
FIG. 18 is a block diagram showing a transmission side WDM terminal station.
Figure 19:
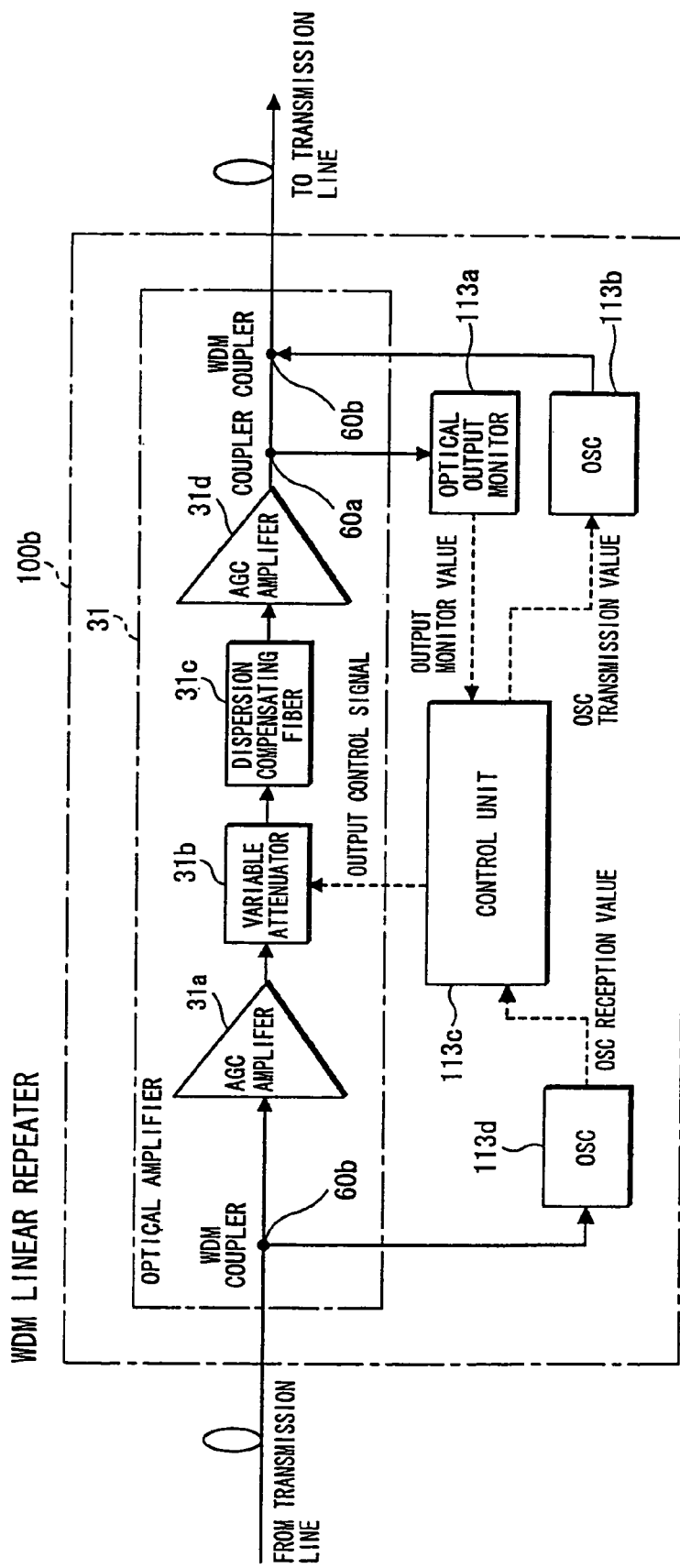
FIG. 19 is a block diagram showing a WDM linear repeater.
Figure 20:
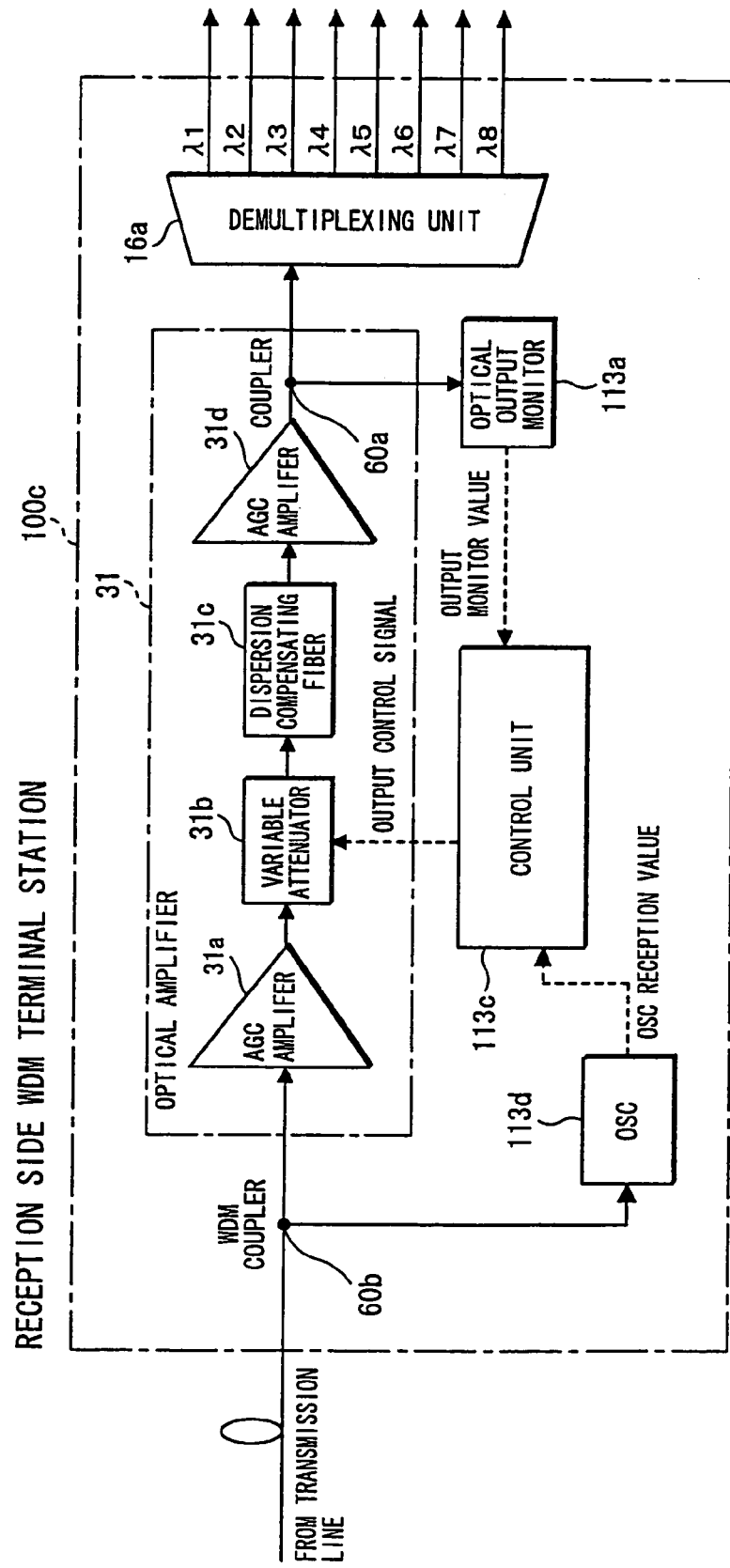
FIG. 20 is a block diagram showing a reception side WDM terminal station.
Figure 21:
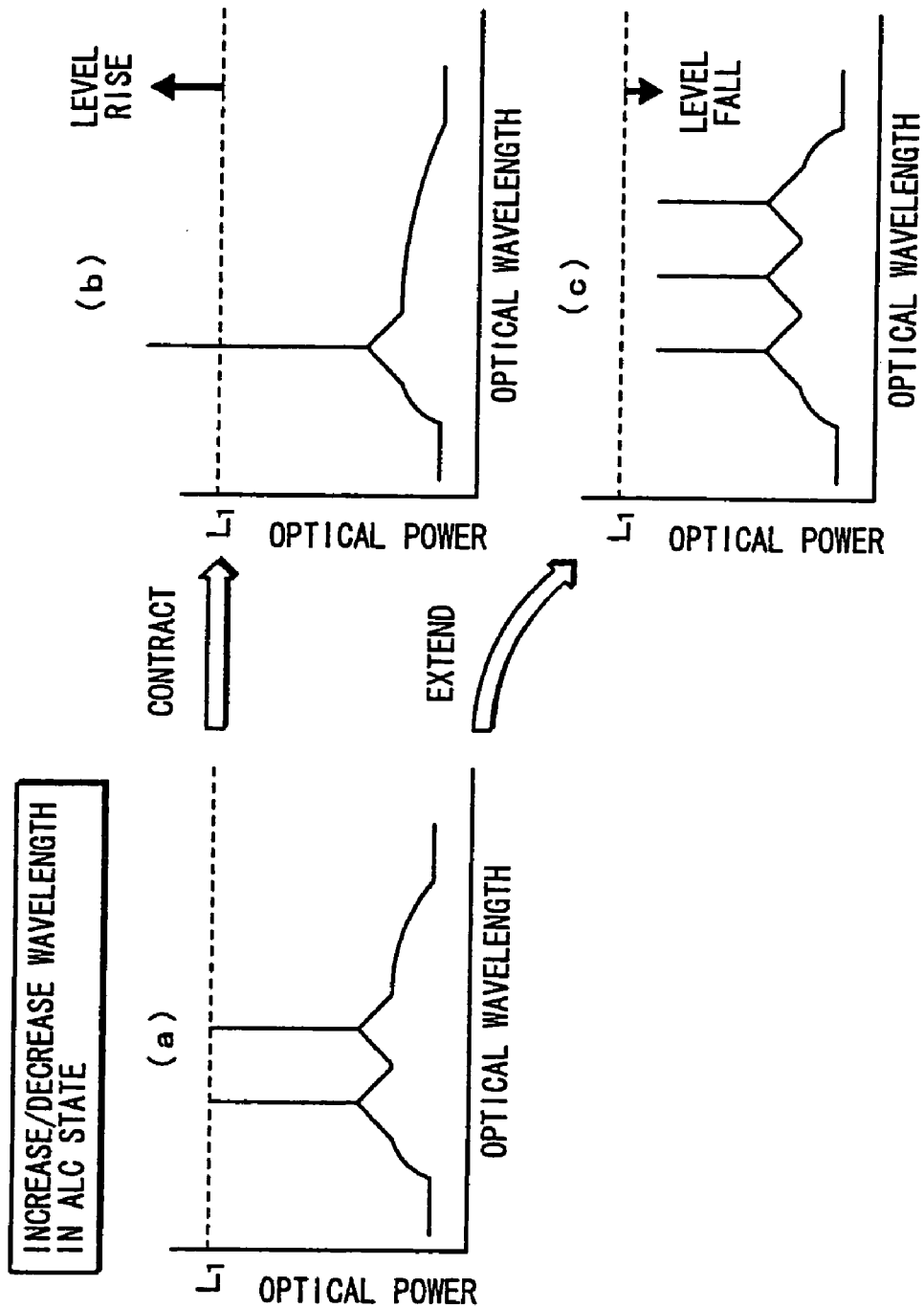
FIGS. 21(a) to 21(c) are illustrations for explaining an ALC operation at an increase/decrease in number of wavelengths.
Figure 22:
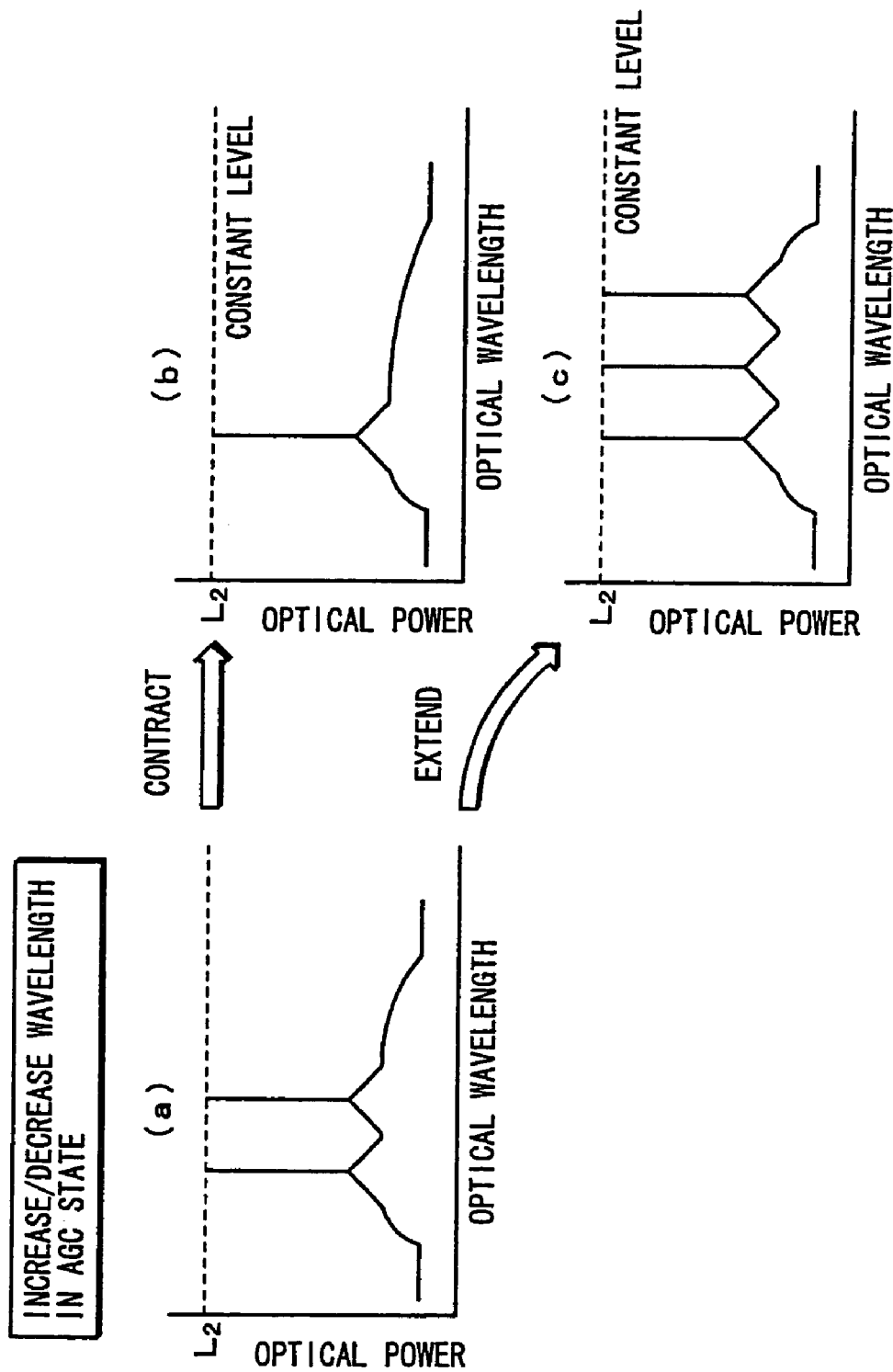
FIGS. 22(a) to 22(c) are illustrations for explaining an AGC operation at an increase/decrease in number of wavelengths.
Figure 23:
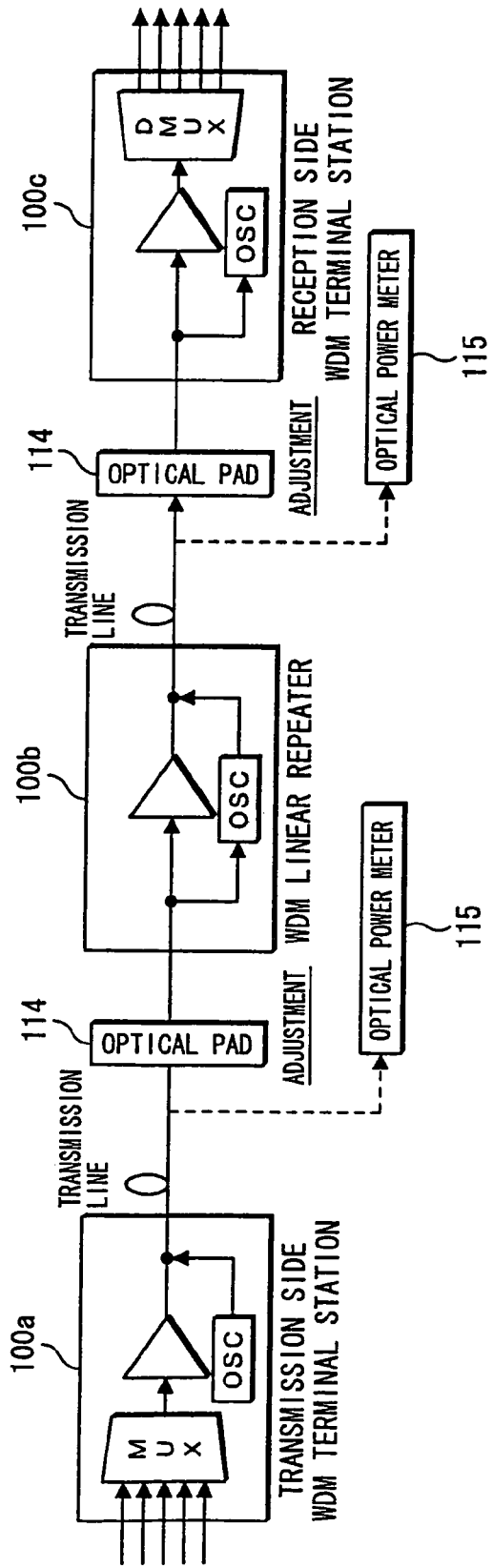
FIG. 23 is an illustration of a configuration of an optical wavelength multiplexing transmission system.

FIG. 17 is a block diagram showing a linear repeater according to the second embodiment of the present invention. In FIG. 17, a linear repeater 10b is a repeater located on two up and down optical fiber transmission lines, and a wavelength-multiplexed light is transmitted from a transmission side WDM terminal station (not shown) through this linear repeater 10b to a reception side WDM terminal station (not shown).

In this case, the linear repeater 10b is made up of a first transmitting/receiving section 55a for amplifying and repeating a wavelength-multiplexed light transmitted from a WDM terminal station, a second transmitting/receiving section 55b for amplifying and repeating a wavelength-multiplexed light transmitted from a WDM terminal station and an apparatus supervisory control unit 54.

The first transmitting/receiving section 55a is composed of an up main signal light amplifying unit 34a, an up output monitoring unit 13, an up input monitoring unit 23 and a first control unit 12a. This up main signal light amplifying unit 34a is for amplifying a wavelength-multiplexed light, and includes two WDM couplers 60b, two couplers 60a, a former-stage AGC amplifier 31a, a variable attenuator 31b, a dispersion compensating fiber 31c and a latter-stage AGC amplifier 31d. These components are the same as those mentioned above, and the further description thereof will be omitted.

The up output monitoring unit 13 has a function to extract output levels of an up main signal light and up OSC light to be outputted to an up downstream-side station, and the up input monitoring unit 23 has a function to extract input levels of an up main signal light and a down OSC light inputted from an up upstream-side station. The duplicate description thereof will be omitted.

The first control unit 12a is connected to the up main signal light amplifying unit 34a, an up OSC light transmitting unit 14a and the up output monitoring unit 13 for calculating a loss on the basis of an output level of an up main signal light and a reception level of an up OSC light received by an up downstream-side station (not shown) to correct the output level of the up main signal light and further for inputting an output level of the up OSC light and an output level of the up main signal light to the up OSC transmitting unit 14a.

With this configuration, in the first transmitting/receiving unit 55a, a wavelength-multiplexed light comprising an up main signal light and an up OSC light is amplified in the former-stage AGC amplifier 31a and then attenuated by a predetermined quantity in the variable attenuator 31b in accordance with a control signal from the first control unit 12a so that the optical level thereof to be inputted to the dispersion compensating fiber 31c is adjusted to an adequate level. Moreover, after the compensation of the dispersion in the dispersion compensating fiber 31c, it is amplified in the latter-stage AGC amplifier 31d. Thus, the level of an up main signal light to be transmitted to the transmission line 51a is ALC-controlled.

Furthermore, the wavelength-multiplexed light amplified in the up main signal light amplifying unit 34a is branched by the output side coupler 60a so that a portion thereof is transmitted to the up optical output monitoring unit 13a. Still furthermore, the wavelength-multiplexed light is coupled with an up OSC light from the up OSC light transmitting unit 14a in the WDM coupler 60b and outputted.

In addition, the up OSC light introduced in an adjacent station (not shown) on the left side of FIG. 17 is separated in the WDM coupler 60b, and an output level monitor value of an up main signal light in an up upstream-side station and information (OSC reception value) on an output level monitor value of an up OSC light are extracted in the up OSC light receiving unit 24b, with this OSC reception value being inputted to the first control unit 12a. Still additionally, in the up OSC input monitoring unit 23b, an up OSC light level is monitored and is inputted as an OSC input monitor value to the first control unit 12a. On the other hand, the branched wavelength-multiplexed light from the WDM coupler 60b is again branched in the coupler 60a so that an input level of the up main signal light is monitored in the up optical input monitoring unit 23a, with the monitor value being inputted as an input monitor value to the first control unit 12a.

Yet additionally, in the first control unit 12a, a down OSC transmission value is calculated on the basis of the input monitor value, the OSC reception value and the OSC input monitor value, and this down OSC transmission value is inserted into the down OSC light transmitting unit 24a. Meanwhile, an output control signal is inputted to the latter-stage AGC amplifier 31d.

Moreover, the second transmitting/receiving section 55b of the linear repeater 10b shown in FIG. 17 is made up of a down main signal light amplifying unit 34b, a down input monitoring unit 33, a down output monitoring unit 43 and a fourth control unit 12b. The down main signal light amplifying unit 34b is similar to the up main signal light amplifying unit 34a, and is for amplifying a main signal light from a down upstream-side station to output it to a down downstream-side station.

The down output monitoring unit 43 has a function to extract of output levels of a down main signal light and a down OSC light to be outputted to the down downstream-side station.

The fourth control unit 12b is connected to the down OSC light receiving unit 14b, a down output monitoring unit 43, the down main signal light amplifying unit 34b and the down OSC light transmitting unit 24a for outputting a reception level of an up main signal light received by the down upstream-side station, a reception level of an up OSC light received by the down upstream-side station, an expected value of an input level of an up main signal light amplified by the down upstream-side station and information on a difference between an input level of an up main signal light amplified by the down upstream-side station and an input level of an up main signal light actually inputted.

Incidentally, the same reference numerals as those used above designate parts having the same or similar functions, and the duplicate description thereof will be omitted.

Thus, a flow of a wavelength-multiplexed light in the second transmitting/receiving section 55b becomes as follows. That is, a down main signal light is amplified in the down main signal light amplifying unit 34b and outputted therefrom, and a wavelength-multiplexed light inputted is branched by the input side coupler 60a of the down main signal light amplifying unit 34b so that the optical input monitoring unit 33a measures an input level of the down main signal light including down control information. In addition, the wavelength-multiplexed light branched by the WDM coupler 60b is monitored by the down OSC light input monitoring unit 33b, with the input monitor value being inputted to the fourth control unit 12b. Still additionally, the down OSC light receiving unit 14b extracts level information included in a down OSC light transmitted through the transmission line 51b.

With this arrangement, a transmission/reception flow of a wavelength-multiplexed light between the linear repeaters 10b and 20b is as follows.

First of all, an optical output level of an up OSC light to be transmitted from the linear repeater 10b to the linear repeater 20b is digitized in the up OSC output monitoring unit 14a and then transmitted to the fist control unit 12a. Likewise, an optical output level of an up main signal light is also monitored and transmitted to the first control unit 12a. The first control unit 12a calculates an output level of the up OSC light and an output level of the up main signal light, with information on these levels being inserted into a down OSC light and transferred to the second control unit 22a of the opposed-side linear repeater 10b.

In addition, in the linear repeater 20b, the first control unit 12a calculates an optical input level of a received up OSC light, an optical input level of an up main signal light, an expected value of an up main signal light input level to the optical amplifier 34a, an up main signal light input to the optical amplifier 34a and difference information relative to an actually inputted optical input level, with these information being transmitted to the opposite-side linear repeater 10b in a state inserted into an opposite-direction (W→E direction) down OSC light.

Still additionally, in the linear repeater 10b, the wavelength-multiplexed light from the transmission line 51b is feedback-transferred through the fourth control unit 12b to the first control unit 12a. Through the use of this feedbacked information, the first control unit 12a calculates a transmission line loss in the transmission line 51a (E→W) on the basis of a difference between an output level of the up OSC light and an optical input level to the optical amplifier 34a of the linear repeater 20b.

Yet additionally, the first control unit 12a of the linear repeater 20b performs a coarse adjustment on an up main signal light output control value for the optical amplifier 34a on the basis of the transmission line loss calculated from the up OSC light, and activates the optical amplifier 34a. When the optical amplifier 34a is activated and an up main signal light is inputted to the optical amplifier 31a, the first control unit 12a carries out a correction on a value outputted from the local optical amplifier 31a on the basis of an expected value of an up main signal light input level to the optical amplifier 31a, thereby accomplishing a fine adjustment on the output level.

As described above, since each of the linear repeaters is equipped with up and down amplifying units/control units constituting two systems, the linear repeater can also execute output control similar to that of a WDM terminal station.

Moreover, as in the case of the WDM terminal station, the optical levels of an OSC light and main signal light received are monitored, thus realizing a function to feedback, through the use of an opposite-direction OSC light, an expected value of a main signal light input level to an optical amplifier and information on a difference relative to an actual input level.

(C) Others

The present invention is not limited to the above-described embodiments, and it is intended to cover all changes of the embodiments, which do not constitute departures from the spirit of the invention.

For example, the definition about the "up" and "down" is for convenience, and even if they are interchanged, the superiority of the present invention does not change. In addition, the contents of the state transmission diagrams or the sequences can somewhat be altered on design for implementation. Still additionally, the former-stage AGC amplifier 31a or the latter-stage AGC amplifier 31d is an optical amplifier which is different from an AGC amplifier using so-called electric signals.

Moreover, the OSC light output function is realized with, for example, an optical oscillator, a laser diode or the like.

INDUSTRIAL APPLICABILITY

As described above, with an optical wavelength multiplexing transmission apparatus according to the present invention, first, the transmission level adjustment can be made through the use of an OSC light regardless of the passing of a main signal light, and as compared with a method of carrying out an automatic adjustment on an optical level through the use of a main signal light itself, it is possible to achieve quicker restoration from troubles stemming from the shutdown of a main signal light or the like. Second, even if the output of an optical amplifier is exposed to disturbance due to a change of the number of wavelengths to be multiplexed in a main signal light, the output of an OSC light does not receive the influence thereof, which can maintain a stable output level without exerting great influence on the calculation of an output level. Third, a signal source for the adjustment of a reception level becomes unnecessary at initial installation, and troublesome adjustments become unnecessary. Moreover, it is possible to prevent the reliability of a transmission line from falling due to the insertion of extra optical parts such as an optical PAD for reception level adjustment. Still moreover, it is possible to cope with a change of transmission line loss with the passage of time after the adjustment in the field and a change of transmission line loss stemming from the moving of a branch office without carrying out the re-adjustment.

What is claimed is:

1. An apparatus comprising:
   an optical device positioned along an optical transmission line, comprising a sub-signal transmitter transmitting a sub-signal light to a downstream side optical device through the optical transmission line; and a controller calculating a loss in the transmission line in accordance with the sub-signal light as received by the downstream side optical device and the sub-signal light to be transmitted by the sub-signal transmitter, by monitoring both of a transmission output level of the sub-signal light from the sub-signal transmitter and a reception input level of the sub-signal light at the downstream side optical device.

2. An apparatus as in claim 1, wherein, in accordance with the calculated loss, the controller adjusts a power level of main signal light output from the optical device and to be transmitted downstream of the optical device.

3. An apparatus as in claim 1, further comprising:

an optical amplifier optically amplifying main signal light to be output from the optical device and to be transmitted downstream of the optical device, wherein the controller controls the optical amplifier to adjust a power level of the main signal light in accordance with the calculated loss.

4. An apparatus comprising:

an optical device positioned along an optical transmission line, comprising a sub-signal transmitter transmitting a sub-signal light to a downstream side optical device through the optical transmission line;

an optical amplifier amplifying main signal light transmitted through the transmission line; and a controller calculating a loss in the transmission line in accordance with the sub-signal light received by the downstream side optical device and the sub-signal light to be transmitted from the sub-signal transmitter, by monitoring both of a transmission output level from the sub-signal transmitter and a reception input level of the downstream side optical device of the sub-signal light, and controlling the optical amplifier in accordance with the calculated loss to adjust a power level of the amplified main signal.

5. An apparatus comprising:

an optical device positioned along an optical transmission line, comprising a sub-signal transmitter transmitting a sub-signal light to a downstream side optical device through the optical transmission line;

an optical amplifier amplifying main signal light transmitted through the transmission line; and means for calculating a loss in the transmission line in accordance with the sub-signal light received by the downstream side optical device and the sub-signal light to be transmitted from the sub-signal transmitter, by monitoring both a transmission output level from the sub-signal transmitter and a reception input level of the downstream side optical device of the sub-signal light, and for controlling the optical amplifier in accordance with the calculated loss to adjust a power level of the amplified main signal.

6. An optical transmission system comprising:

first and second optical devices connected to each other through first and second optical transmission lines, the first optical device comprising a first sub-signal transmitter transmitting a first sub-signal light to the second optical device through the first optical transmission line; and a controller calculating a loss in the first transmission line in accordance with the first sub-signal light received by the second optical device and the first sub-signal light to be transmitted by the first sub-signal transmitter, by monitoring both a transmission output level from the first sub-signal transmitter and a reception input level of the second optical device of the first sub-signal light.

7. The optical transmission system as in claim 6, wherein the first optical device comprises a first monitor monitoring the transmission output level of the first sub-signal light from the first sub-signal transmitter, and the second optical device comprises a second monitor monitoring the reception input level of the first sub-signal light at the second optical device; and the system further comprises a second sub-signal transmitter transmitting a second sub-signal light to the controller through the second optical transmission line, the second sub-signal light including information indicating the reception input level of the first sub-signal light monitored by the second monitor.

* * * * *

UNITED STATES PATENT AND TRADEMARK OFFICE
CERTIFICATE OF CORRECTION

PATENT NO.        : 7,099,595 B2                                    Page 1 of 1
APPLICATION NO.   : 10/893322
DATED             : August 29, 2006
INVENTOR(S)       : Eisaku Touma It is certified that error appears in the above-identified patent and that said Letters Patent is hereby corrected as shown below:

Title Page, Column 2 (Abstract), Line 8, after "(52a)" insert --,--.

Signed and Sealed this

Thirteenth Day of February, 2007

JON W. DUDAS
*Director of the United States Patent and Trademark Office*